United States Patent [19]
Bhargava et al.

[11] Patent Number: 6,044,216
[45] Date of Patent: *Mar. 28, 2000

[54] METHOD AND APPARATUS FOR IMPLEMENTING CURSOR VARIABLES FOR ACCESSING DATA FROM DATABASE

[75] Inventors: Sunil Bhargava, San Carlos; Olga Peschansky, Cupertino, both of Calif.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,801

[22] Filed: Jun. 24, 1996

[51] Int. Cl.[7] .................................................. G06F 9/44
[52] U.S. Cl. ............................................................ 395/701
[58] Field of Search .............................................. 395/701

[56] References Cited

PUBLICATIONS

Oracle, "PL/SQL User's Guide and Reference Release 2.3", Chapter 5, pp. .5–1 to 5–38, 6–5 to 6–6, 10–23 to 10–33, A–3, 1996.
Oracle, "Cooperative Server Technology, Oracle7 Server Messages, Release 7.2", Chapter 3, pp.3–1 to 3–48, 1995.
Oracle, "Cooperative Server Technology, Oracle7 Server Messages, Release7.3", Chapter 3, pp. 3–1 to 3–54, 1995.
Oracle, "Cooperative Server Technology, Oracle7, Server Application Developer's Guide, Release 7.2", pp. 2–8 to 2–9, 6–15 to 6–16, 11–1 to 11–22, 1992.
Oracle, "Oracle7 Server Application Developer's Guide, Release 7.3, Feb. 1996", Chapter 10, pp. 10–1 to 10–24, 1992
Oracle, "Cooperative Server Technology, Oracle7 Server SQL Reference, Release 7.2", pp. 1–4 to 1–5, 4–10, 4–128, 4–327 to 4–364, 1992.
Oracle, "Cooperative Server Technology, Oracle7 Server SQL Reference, Release 7,3", pp. 1–4 to 1–5, 4–139, 4–341 to 4–345, 4–376 to 4–377, 1992.
The Design and Evolution of C ++ Bjarne Stroustrup, Mar. 9, 1994.
Microsoft's Visual Basic version 3.0 Programming System for Windows, 1993.
A Generic SQL Class Library Dr. Dobbs, Ken North, Sep. 1993.
Structured Programming Dr. Dobbs J. Duntemann, Mar. 1993.
Database Development and Visual Basic 3.0 Ken North, Mar. 1994.
Microsoft Query User's Guide Version 1.0, 1994.
Distionary of Object Technology Firesmith et al, 425, 458, 459, Sep. 1995.
Aho et al. "Compliers Principles, Techniques, and Tools" pp. 65, 202, 343–388, 390, 396, 407, 404–415, 424–429, 440, 467, 478–488, 653–654, Sep. 12, 1985.
Oracle PL/SQL User's Guide and Reference Release 2.2 p. i, 1–6, 2–10, 2–16, 2–17, 4–1, 4–9, 4–11, to 4–13, 4–17, to 4–25, 5–6, 6–17, 6–18, to 6–21, 7–13, 9–7, 9–23 to 0–95, 9–108, Mar. 1995.
Object Oriented Analysis and Design, Grady Booch pp. 176–179, 1994.

*Primary Examiner*—Tariq R. Hafiz
*Assistant Examiner*—Todd Ingberg
*Attorney, Agent, or Firm*—Blakely, Sokoloff, Taylor & Zafman

[57] ABSTRACT

A method and apparatus for implementing a data construct, referred to herein as a "cursor variable", that has many of the attributes of simple variables and that can be used to access active sets of data from a database. Cursor variables identify a current set of data in an active set generated as a result of a database query. A cursor variable can be associated with any one of a number of different queries at any given time during program execution without using a host programming language. As a result, different active sets having different columns, different tables, and/or different predicates may be associated with the same cursor variable using instructions from a single programming language.

51 Claims, 11 Drawing Sheets

METHOD AND APPARATUS FOR IMPLEMENTING CURSOR VARIABLES FOR ACCESSING DATA FROM DATABASE

BACKGROUND OF THE INVENTION

1. Field of the Invention

The present invention relates to database management systems, and more specifically, to a method and apparatus for accessing data from a database.

2. Background Information

Nearly all high-level programming languages support various constructs (e.g., constants, variables, composite types, collection types, etc.) for manipulating data. A constant is a named item that retains a constant value throughout the execution of a program, as opposed to a variable, which can have its value changed during execution. A composite type is a defined set of one or more simple variables or other composite types, that is regarded in a program as a single entity. An example of a composite type is a record. A collection type is a structure used to store a list of data values having the same data type (e.g., arrays).

A data type is a definition of a set of data that specifies the possible range of values of the set, the operations that can be performed on the values, and, to some extent, suggests the way in which the values are stored in memory. Nearly all high-level languages include the following data types: integer, floating-point number, character, boolean, and pointer. Typically, when the constructs described above are used in a computer program, they are declared to be of a certain data type. For example, a program can declare a character variable or an integer variable. An array may be an array of pointers or an array of boolean values. In addition, compilers for high-level programming languages typically allow at least certain of the supported data constructs to be passed to routines as arguments. The term routine is used herein to refer to a named sequence of source code instructions within a program, which when compiled, can be executed. Thus, the term routine is used herein to refer to procedures, functions, subprograms, etc.

Nearly all compilers for high-level programming languages also include the concept of type checking. Type checking is the examination of the operations in a program during compiling or execution to make sure that the correct data types are being used. For example, if a routine requires two integers as arguments and the program provides an integer and a floating point value as arguments to the routine, then a compiler/interpreter capable of detecting this mismatch would generate a compile-time error. If the error is not detected at compile-time, then it should be detected upon execution of the routine and a run-time error (also referred to as an exception) should be generated. If the error is not detected at compile-time or during execution, the behavior of the program will be unpredictable.

Many programming languages also support conversions between various data types (referred to herein as "data type conversions"). For example, an integer representation of the value 10 may be converted into a floating point representation (1.0E1) of the value 10, a text representation of the number "10", etc. Many programming languages support "explicit" data type conversion. To cause an explicit data type conversion, a program must specifically indicate the data type conversion is to occur (e.g., In PL/SQL, execution of "TO_CHAR (10)" yields a character representation of the number 10). Otherwise, an error will be generated as a result of the data type mismatch as described above. In addition to explicit data type conversions, some advanced programming languages (e.g., Oracle SQL and PL/SQL) also support "implicit" data type conversions (the data type conversions are performed without source code that explicitly designates the data type conversions are to occur). Rather than generating an error in response to a data type mismatch, a compiler supporting implicit data type conversions determines if the required conversion is supported as an implicit data type conversion. If the implicit data type conversion is supported, the required instructions to perform the data type conversion are inserted into the compiled code. Otherwise, a compile-time error is generated.

Many high-level programming languages also include the ability to declare variables as either strong (referred to herein as "strong typing") or weak (referred to herein as "weak typing"). If a variable is declared using strong typing, the programming language will not allow the program to change the data type of the variable during program execution. In contrast, if a variable is declared using weak typing, the program is able to change the data type of the variable during program execution.

For certain applications (e.g., database management systems), the above described constructs have proved to be insufficient. A database management system (DBMS) is a layer of software between the physical database (i.e., the files storing the data in the database) and the user. The DBMS manages all requests for database action (for example, queries or updates) from the user. In addition, a DBMS permits centralized control of security and data integrity requirements. As an example, a DBMS may be used for tracking airline reservations or managing payroll information.

Many database systems take advantage of distributed processing by using a client/server architecture. In this architecture, the database is divided into two parts: a frontend or a client portion, and a backend or a server portion. The client portion is the frontend database application that interacts with the users through keyboards, displays, and pointing devices such as mice. The client portion concentrates on requesting, processing, and presenting data managed by the server portion. The server portion runs server software and handles the functions required for concurrent, shared data access. Of course, the client-server architecture can be distributed across a network. For example, each of the client applications may be executed at a different node of the network, while one or more other nodes on the network are used for storing the database and executing the server software to process database requests sent by users at the client nodes.

To request data from a database, a client application may be written in any number of programming languages (e.g., the PL/SQL programming language developed by Oracle Corporation). In response to executing the client application, the client will cause the server portion to perform the required operations on the information in the database. PL/SQL is a structured programming language that supports flow of control statements (e.g., routines, if-then-else statements, exceptions, loops, etc.), as well as statements that provide the data manipulating functionality of SQL (the standard database access language for relational database management systems). In addition to other aspects of SQL, PL/SQL supports the "type system" (e.g., data types and type conversions, etc.) of SQL, as well as the comparison, set, and row operators of SQL.

A PL/SQL engine for executing routines written in PL/SQL code (e.g., packages, procedures, functions, etc.) can be present on either or both of the client and server sides.

PL/SQL routines stored on the server side are referred to herein as stored routines. These stored routines can be called by the client applications. As a result of this architecture, PL/SQL routines can be centrally located, thereby reducing network traffic between applications and the database. In addition, users of PL/SQL can access data only as intended by the database developer.

As a result of the insufficiencies of general-purpose high level programming data constructs, special-purpose constructs referred to herein as "cursors" are supported by various database languages (e.g., SQL, PL/SQL, etc.). A cursor is a handle (a name or pointer) to the set of rows produced in response to executing a specific query statement. In the prior art, there are generally two types of cursors, "static cursors" and "dynamic cursors."

The PL/SQL language includes a number of statements for manipulating static cursors, including a declaration statement, an OPEN statement, a FETCH statement, and a CLOSE statement. A static cursor body is defined using the following syntax:

CURSOR cursor_name [(parameter[, parameter, . . . ])] IS <sql query>;

where [ ] indicates optional and <sql query> is a legal SQL query. The columns and the tables which the static cursor will access must be specified in the <sql query> at the time the static cursor body is defined. An example of a format for a legal SQL query is:

SELECT {column_name[, column_name, . . . ] | *} FROM table_name [WHERE predicate | parameterized predicate];

where | indicates "or" and * indicates all columns of the selected tables. The text starting with "SELECT" is referred to as the select statement. The part of the query following "WHERE" is referred to as the where clause or predicate. The predicate is a set of search criteria for accessing data from the database (e.g., empno>2, where empno is the name of a column). Thus, the predicate determines the rows that will be accessed from the database. The predicate may optionally be parameterized. A parameterized predicate allows the set of search criteria to be varied based on one or more variables (e.g., empno>x, where x is a variable). By changing the parameter value during run-time, the rows returned from the database using the static cursor may be varied as allowed by the predicate chosen when the static cursor is defined. However, like the columns and the tables, the predicate is chosen when the static cursor body is defined.

The set of rows returned in response to execution of a query is called the active set. The size of an active set is the number of rows that meets the search criteria of the query. To provide an example of the operation of static cursors, two exemplary database tables are respectively shown below in Tables 1A and 1B. As shown in Table 1A, the database table employee_info includes columns for the employee's name (ename), number (empno), department (dept), and salary. As shown in Table 1B, the database table employee_position includes columns for the employee's name (ename) and position.

TABLE 1A

| ename | empno | dept | salary |
|-------|-------|------|--------|
| Jeff  | 1     | 10   | 20,000 |
| Jim   | 2     | 20   | 10,000 |
| Joe   | 3     | 20   | 12,000 |
| Jack  | 4     | 30   | 50,000 |

TABLE 1B

| ename | position   |
|-------|------------|
| Jeff  | Manager    |
| Jim   | Programmer |
| Joe   | Programmer |
| Jack  | President  |

Thus, the statement:

CURSOR cursor1 IS SELECT ename, empno FROM employee_info;

would generate a static cursor that could be used to access the active set shown below in Table 2. As shown in Table 2, the active set includes the ename and empno columns from the table employee_info.

TABLE 2

|           | ename | empno |
|-----------|-------|-------|
| cursor1 -> | Jeff  | 1     |
|           | Jim   | 2     |
|           | Joe   | 3     |
|           | Jack  | 4     |

The OPEN, FETCH, and CLOSE statements are used to control static cursors. In response to the OPEN statement, the server portion of the database executes the query associated with the static cursor, identifies the active set, and positions the cursor before the first row. The OPEN statement has the following format:

OPEN cursor_name;

Thus, executing the statement "OPEN cursor1;" the server would identify the active set shown in Table 2 and position the static cursor before the first row in the active set.

The FETCH statement causes the server portion to advance the static cursor one row, retrieve the data in the current row, and store the retrieved data in the specified variables. The FETCH statement has the following format:

FETCH cursor_name INTO {record_name | variable_name[, variable_name, . . . ]};

where record_name represents a previously defined record variable and the one or more variable_names represent one or more simple variables.

The CLOSE statement disables the static cursor. The CLOSE statement has the following format:

CLOSE cursor_name;

FIG. 1 is a block diagram illustrating certain aspects of static cursors. FIG. 1 shows an active set 100 comprised of data selected from one or more tables 110. As previously described, the active set 100 would include one or more columns and zero or more rows. A limitation of static cursors is that the number and names of the columns, the order of the columns, and the number and names of the tables, are fixed or static. Thus, a different static cursor must be defined for each query in which any of these attributes vary.

For example, cursor1 above returns the columns ename and empno from table employee_info. However, assuming a user is also interested in different columns from the same table, another static cursor would have to be declared. As an example, the statement:

CURSOR cursor2 IS SELECT ename, dept FROM employee_info;

would generate a static cursor that could be used to access the active set shown in Table 3.

TABLE 3

|  | ename | dept |
|---|---|---|
| cursor1 -> | Jeff | 10 |
|  | Jim | 20 |
|  | Joe | 20 |
|  | Jack | 30 |

As another example, if the user is interested in all of the columns from the employee_info table, another static cursor would have to be defined in the source code. Such a static cursor would be generated by the following:

CURSOR cursor3 IS SELECT * FROM employee_info;

Thus, due to the static nature of the static cursor construct, three different static cursors are required to access different active sets from the same table.

In addition, static cursors are limited in that the selected table(s) are static. For example, to generate an active set from the employee_position table shown above in Table 1B, an additional static cursor would have to be defined in the source code (e.g., CURSOR cursor4 IS SELECT * FROM employee_position;).

Furthermore, the rows that are returned to the client application using a particular static cursor is limited by the predicate chosen at the definition of the particular static cursor. For example, if "empno=x" is used as the parameterized predicate, the user could not select rows that meet "empno>x" or "empno<x". In addition, at run-time the user cannot vary the rows returned using a static cursor based on criteria (e.g., values in other columns) that was not chosen when the static cursor was defined. Thus, a different static cursor must be declared in the source code of the client application for each such variation of active set needed by the user. These limitations make the static cursor construct cumbersome to program with.

The inability to associate static cursors with different queries at run-time is addressed by another prior art cursor construct referred to herein as "dynamic cursors." According to the standard adopted by the American National Institute of Standards (ANSI), dynamic cursors have the limitation of requiring a "host programming language" or an "embedding language." Within source code written in the host programming language (referred to herein as the "host environment"), blocks of SQL statements may be embedded (referred to herein as "embedded SQL blocks"). Preprocessors can be implemented for a high-level programming language, such as C, COBOL, or ADA, to allow the high-level programming language to act as a host programming language. An "embedded SQL host program" is a compilation unit (i.e., source code to be compiled) that consists of statements in the host programming language and embedded SQL blocks. Any data that needs to be communicated between the host environment and an embedded SQL block must be placed in "embedded host variables." An embedded host variable is a construct generated by the execution of instructions written in the host programming language. An embedded host variable may be used in an embedded SQL block as well.

A limitation of dynamic cursors is that each SQL statement identifier that is used to associate a dynamic cursor with a particular query must be unique in the executable image of an application. Having a unique name for each SQL statement identifier is difficult when a team of programmers is developing different parts of an application over a period of time. In addition, since the SQL programming language supports a different "type system" than prior art host programming languages, data must be converted between the data types supported by host programming languages and SQL. Furthermore, prior art database systems support the use of dynamic cursors on the client side, but do not support the use of dynamic cursors in stored routines on the server side.

A further limitation of static and dynamic cursors is that they cannot be passed between routines as arguments. This greatly reduces the programming flexibility of the static and dynamic cursor constructs. For example, FIG. 2 is a block diagram illustrating the use of static and/or dynamic cursors in one database architecture. FIG. 2 shows a line 200 dividing the database architecture into a client side and a server side. On the client side, there resides a number of client applications 210. Each client application is typically executing on one node (e.g., a work station having one or more processors) or multiple nodes of a computer system. On the server side, there resides one or more sets of server code 220 executing on the same or different nodes of the computer system. One or more of the client applications 210 may be executed on the same nodes as one or more of the sets of server code 220. The client applications 210 and the sets of server code 220 communicate via an Application Program Interface. The Application Program Interface is a layer of software between the client applications and the server code.

Unfortunately, since static and dynamic cursors cannot be passed as arguments between the client and server sides, the required statements to define, open, fetch, and close static and dynamic cursors must reside either all on the client side or all on the server side. For example, a server may be programmed to contain a first stored routine to open a static cursor and a second stored routine to fetch a row from that static cursor and return the row to the client. When a client application needs to retrieve rows from the database, the client application must call the first stored routine to open the static cursor and iteratively call the second stored routine to return one fetched row at a time. Assuming the client application needs 5,000 rows, 5,001 round trips will be performed—one round trip to open the static cursor and one round trip per row fetched. Due to the large number of stored routine calls required using this approach, the statements required to define, open, fetch, and close the required static and/or dynamic cursors are typically placed in the client applications. As illustrated by the following example, this greatly reduces the ability to alter installed client applications.

Typically, a business needs a database to store information in a manner in which its employees (users) can easily access it. For example, a business would want to store payroll information in a manner in which the accounting department employees can easily manage the payroll. Such a business would contact a database supplier to provide the basic server code and database architecture. In addition, that business would contact a client application provider (this may be the same company that provides the server code). The business communicates to the client application provider the functionality its employees will require. The client application provider then writes and compiles the client application(s) (as well as any required stored routines to be added to the server code) for installation at the various client and server sites.

Since each client application must contain the required static or dynamic cursor statements, adding new queries or modifying existing queries requires altering each client application at each client site. Since there can be thousands of client sites, this is a very time-consuming and expensive process. As an example, if the business decides that its employees require a different query from the database, then: 1) the client application source code would have to be altered, recompiled, and reinstalled at all the client sites; and/or 2) a patch would have to be distributed and applied at all of the client sites to alter the client applications. Due to the enormity of the task of updating every client site, it is common practice in the industry for the client application provider to provide only one recompile per database version change (e.g., Oracle 7 to Oracle 8).

One technique used to avoid the limitation of not being able to pass static and dynamic cursors as arguments is to use collections to pass the results of static and dynamic cursors. To illustrate the technique of using collections, assume a variable of the collection type is declared. Each element in the declared collection variable is of a record type consisting of the appropriate fields to hold the result of a row returned by the desired query. The client application calls a stored routine on the server side. Execution of the stored routine executes a query using a static cursor, retrieves as many rows from the result set identified by the query as will fit in the collection variable, and returns the collection variable to the client application as an argument. Of course, the cursor used on the server side in this example cannot be a dynamic cursor because dynamic cursors cannot be used in stored routines.

In addition to the limitations imposed by using a static cursor in the stored routine, the use of the collection variable suffers from additional limitations. For example, the use of collections to return the results of a query requires a significant amount of memory because the memory for the collection variable must be allocated on both the client and server sides. One approach to limiting the memory required to store the collection variable is to limit the number of elements in the collection variable (e.g., create a collection variable with 100 elements). Unfortunately, if the result set being returned has more rows than the number of elements in the array, the entire result set will not be returned. Alternatively, a collection variable can be declared to be of unlimited size. However, since a result set can include a large number of rows, the memory required to store the collection variable can be quite large. If the memory required to store the collection is not available, the technique of using collections is not viable. As another example, flexibility with respect to the number of rows returned to the client is reduced when using collections. As yet another example, the use of a collection to return query results is not evident from the argument list of a procedure.

In contrast to static and dynamic cursor constructs, one database architecture includes an additional construct referred to herein as the "result set" construct. Results sets allow for the return of data according to one or more queries in the form of a single data stream. To create such a stream, one or more SELECT statements are written without INTO clauses in a stored routine. As a result of calling a stored routine that contains such a select statement, the data stream will be created. The contents of the stream may then be accessed by the client.

A limitation of the result set construct is that the data identified by each of the select statements in the stored routine must be accessed sequentially. For example, assuming a first select statement identifies 5,000 rows from a first table and a second select statement identifies 4,000 rows from a second table. The data stream will sequentially provide the 5,000 rows from the first table followed by the 4,000 rows from the second table. As a result, if the client application needs the first 5 rows from both tables, it must sequentially process the 5,000 rows of the first table before reaching the first 5 rows from the second table. In addition, there is no way to back up in the data stream. Once a piece of data has been pulled off the data stream, another data stream must be opened to retrieve it again. Thus, if after processing the 5,005 rows in the above example, the client application determines it needs rows 50–100 from the first table, the client application must either: 1) have stored rows 50–100 when the client application pulled them form the data stream; or 2) open another data stream and re-process rows 1–100 from the first table.

Another limitation of the result set construct is that the resulting data stream does not identify when one row ends and the next begins. Rather, for each select statement the data stream includes a "row type identifier" to mark the beginning of data accessed according to that select statement. To describe what a row type identifier is, it must first be understood that a data type must be specified for each column of a table indicating the type of data that can be stored in that column. For example, the first column of a table may contain character data, the second column may contain integer data, the third column may contain date information, etc. The columns selected from one or more database tables for a particular active set contain the same data types as defined for the selected database columns. Since each column of a database table stores a particular data type, the data types and the order of the data types for the data elements in each row of a database or active set is defined.

In the previous example, the first three data elements in a row of data accessed from the database would respectively be of the character, integer, and date data type. The ordered list of data types defined for rows of a table or an active set is referred to as the table or active set's "row type." A row type identifier is a description of the row type defined by a select statement. Since the data stream does not identify when one row ends and the next begins, the client application must be sophisticated enough to detect the row type identifiers and decode the data stream (detect when each row begins and ends) using the format identified by the row type identifiers. In addition, since data accessed according to multiple select statements is placed serially in the data stream, the client application must be able to detect the row type identifiers to determine when the results from one SELECT statement end and the next begin.

Another limitation of result set constructs is that result set constructs cannot be declared as arguments of routines, and therefore, cannot be passed as arguments between routines. In fact, the data stream generated by a result set is immediately passed back to the client. Another limitation of the result set construct is that it does not fall into any standard high-level programming language construct categories or SQL standard construct categories. Therefore, its use is not intuitive to programmers. The result set construct is described in greater detail in *Transact-SQL User's Guide for SYBASE SQL Server*™, Release 10.0, Sybase, Inc. (1993).

SUMMARY OF THE INVENTION

A method and apparatus for implementing a data construct, referred to herein as a "cursor variable", is provided. A cursor variable has many of the attributes of simple variables and can be used to access active sets of data from a database. According to one aspect of the invention, cursor variables are similar to static and dynamic cursors in that they identify a current row in an active set generated as a result of a database query. However, cursor variables differ from static and dynamic cursors in that a cursor variable can be associated with any of a number of different queries at any given time during program execution without using a host programming language. As a result, different active sets involving different columns, different tables, and/or different predicates may be associated with the same cursor variable using instructions from a single programming language.

According to another aspect of the invention, cursor variables can be passed as arguments between various routines (e.g., between routines in a client application, between routines in a client application and stored routines, between stored routines in the same server, between stored routines in different servers, etc.).

According to yet another aspect of the invention, each cursor variable can be strongly or weakly typed. A cursor variable is strongly typed by assigning it a particular row type. A strongly typed cursor variable can only be associated with "type-compatible" row types, while a weakly typed cursor variable can be associated with any row type.

According to another aspect of the invention, one cursor variable can be assigned to another cursor variable. In addition, the assignment of one cursor variable to another cursor variable results in aliasing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

This application describes a method and apparatus for implementing a construct, referred to herein as a "cursor variable", that has many of the attributes of variables and that can be used to access active sets of data from a database. In the following description, numerous specific details are set forth to provide a thorough understanding of the invention. However, it is understood that the invention may be practiced without these specific details. In other instances, well-known circuits, structures and techniques have not been shown in detail in order not to obscure the invention. Although PL/SQL is used throughout this document to describe an implementation of the cursor variable construct, such a construct could be implemented using any number of other database languages.

Hardware Overview

Figure 3:
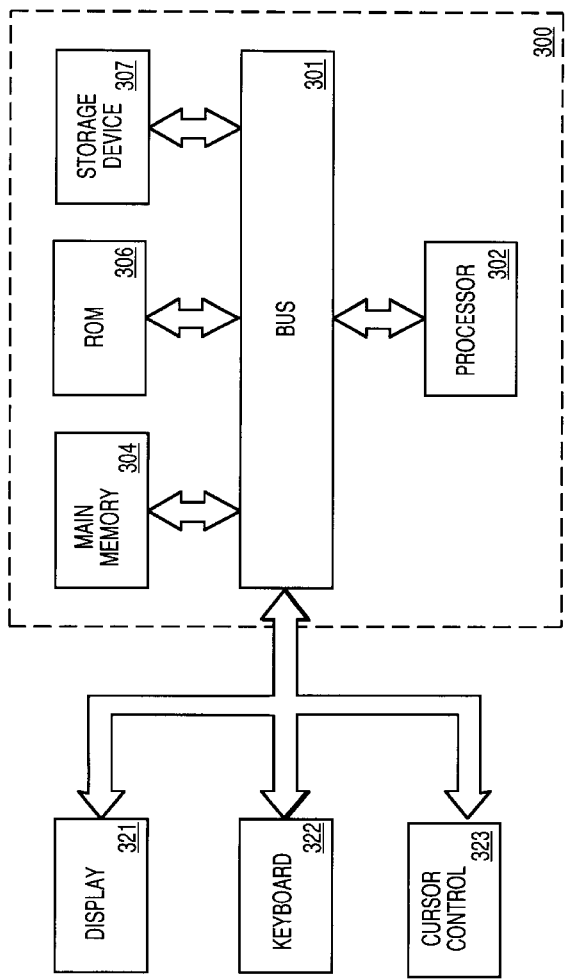
FIG. 3 is a block diagram illustrating an exemplary computer system 300 upon which the invention can be implemented.

FIG. 3 is a block diagram illustrating an exemplary computer system 300 upon which the invention can be implemented. The computer system 300 comprises a bus or other communication means 301 for communicating information, and a processing means 302 coupled with the bus 301 for processing information. The computer system 300 further comprises a random access memory (RAM) or other dynamic storage device 304 (referred to as main memory), coupled to the bus 301 for storing information and instructions to be executed by the processor 302. A main memory 304 also may be used for storing temporary variables or other intermediate information during execution of instructions by the processor 302. The computer system 300 also comprises a read only memory (ROM) and/or other static storage device 306 coupled to the bus 301 for storing static information and instructions for the processor 302. A data storage device 307, such as a magnetic disk or optical disk and its corresponding disk drive, may also coupled to the bus 301 for storing information and instructions.

The computer system 300 can also be coupled via the bus 301 to a display device 321, such as a cathode ray tube (CRT), for displaying information to a computer user. An alphanumeric input device 322, including alphanumeric and other keys, is typically coupled to the bus 301 for communicating information and command selections to the processor 302. Another type of user input device is cursor control 323, such as a mouse, a trackball, or cursor direction keys for communicating direction information and command selections to the processor 302 and for controlling cursor movement on the display 321. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack the keyboard 322, wherein all interface is provided via the stylus as a writing instrument (like a pen) and the written text is interpreted using optical character recognition (OCR) techniques.

In one embodiment, the invention is related to the use of computer system 300 to implement a database that supports the data construct referred to herein as "cursor variables". In this embodiment, cursor variables are generated and manipulated by the computer system 300 in response to the processor 302 executing sequences of instructions contained in the memory 304 as described later herein. In alternative embodiments, hard-wired circuitry may be used in place of or in combination with software instructions to implement the invention. Thus, the invention is not limited to any specific combination of circuitry and software.

Cursor Variable Overview

In one embodiment, cursor variables are similar to static and dynamic cursors in that they identify a current row in an active set generated as a result of a database query. However, cursor variables differ from static and dynamic cursors in that a cursor variable can be associated with any of a number of different queries at any given time during program execution without the use of a host programming language. As a result, different active sets involving different columns, different tables, and/or different predicates may be returned to the client application with the same cursor variable using instructions from a single programming language. In addition, cursor variables can be passed as arguments between various routines (e.g., between routines in a client application, between a routine in a client application and a stored routine, between stored routines in the same server, between stored routines in different servers, etc.). Furthermore, each cursor variable can be strongly or weakly typed. A cursor variable is strongly typed by assigning it a particular row type. A strongly typed cursor variable can only be associated with "type-compatible" row types, while a weakly typed cursor variable can be associated with any row type. In addition, cursor variables can be assigned to other cursor variables. Furthermore, cursor variables can be fully described in the database catalog. Additionally, Application Program Interfaces that support the return of argument information can be implemented to return information concerning cursor variables passed as arguments.

Figure 1:
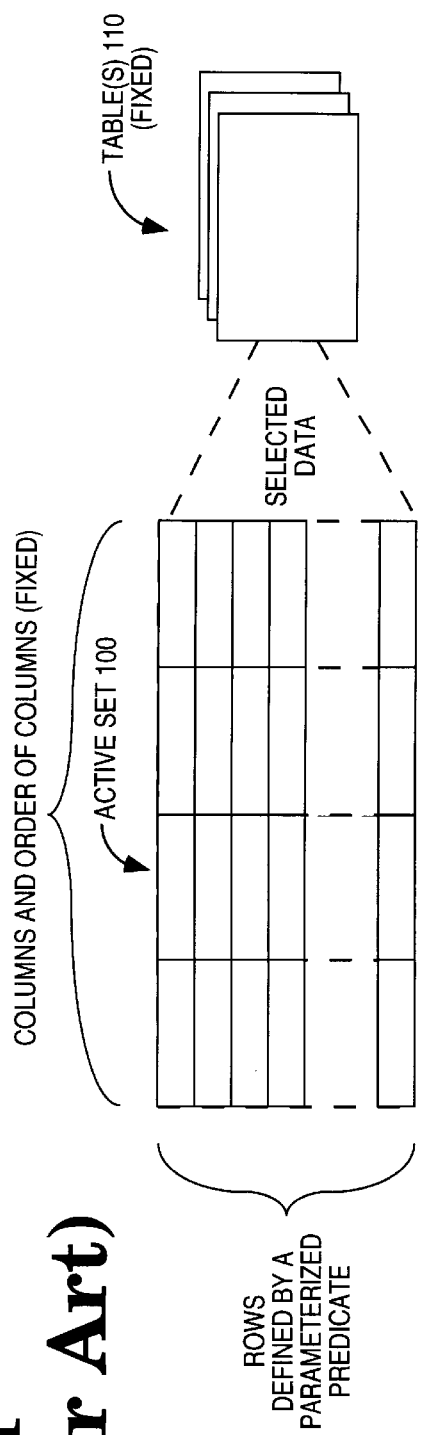
FIG. 1 is a block diagram illustrating certain aspects of static cursors.
Figure 4:
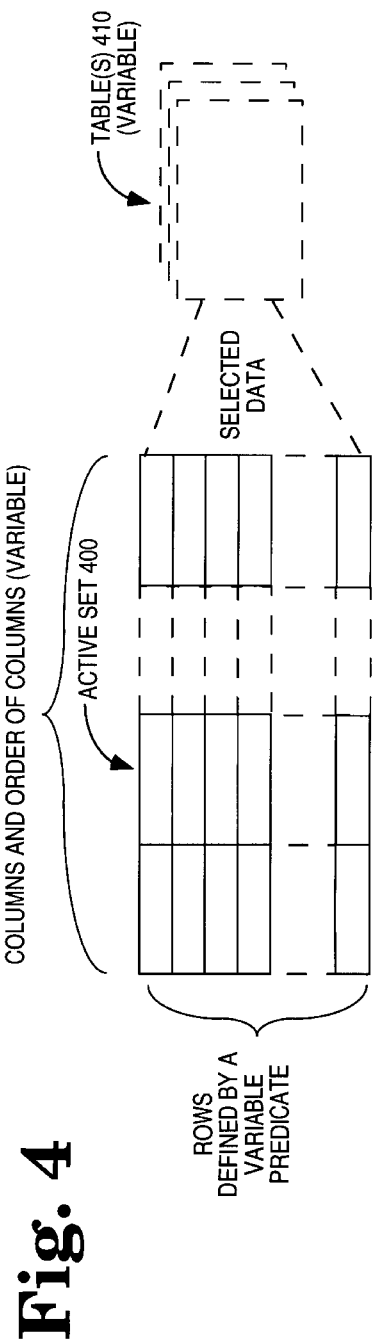
FIG. 4 is a block diagram illustrating the variable nature of the query associated with a cursor variable according to one embodiment of the invention.

FIG. 4 is a block diagram illustrating the variable nature of the query associated with a cursor variable according to one embodiment of the invention. Dashed lines are used to illustrate those aspects of the cursor variable that may be varied. FIG. 4 shows an active set 400 comprised of data selected from one or more tables 410. Similar to the active set 100 described with reference to FIG. 1, the active set 400 includes one or more columns and one or more rows. However, unlike the active set 100, the number and names of the columns, as well as the order of the columns, in the active set 400 can be altered. In addition, the tables from which the rows of data are accessed to generate the active set 400 can be varied. As previously described, the rows of the active set associated with a static cursor can only be varied through the use of the parameterized predicate chosen at the cursor's definition. However, unlike static cursors, the predicate used to define the rows of the current active set associated with a cursor variable can also be altered. Thus, like dynamic cursors, the entire query associated with a cursor variable may be altered during execution. However, unlike dynamic cursors, cursor variables do not require SQL statements be embedded in a host programming language. In contrast, client and server programs can be written in a single programming language that supports cursor variables. While one embodiment is described in which all of the above variations are possible, alternative embodiments may be implemented to include only some of the above described flexibility.

Figure 5:
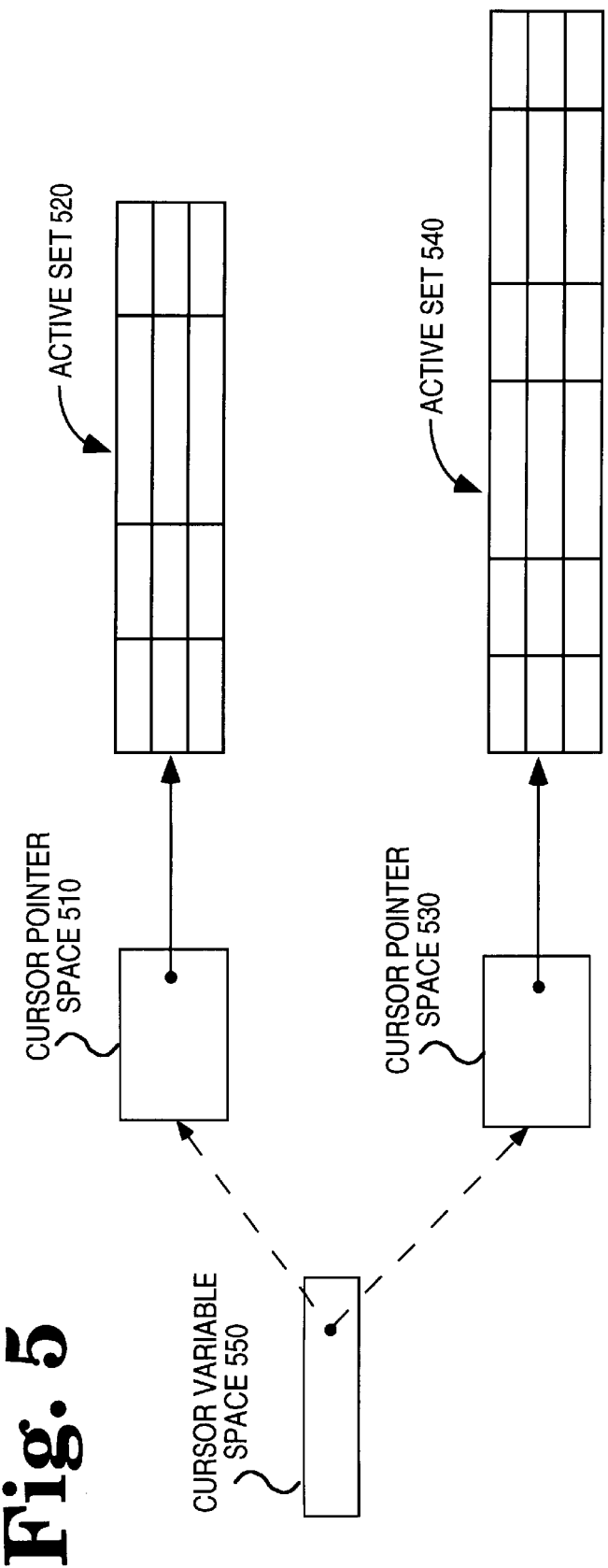
FIG. 5 is a block diagram illustrating one technique for varying the query associated with a cursor variable according to one embodiment of the invention.

FIG. 5 is a block diagram illustrating one technique for varying the query associated with a cursor variable according to one embodiment of the invention. During execution of a routine including a cursor variable, a cursor pointer space is allocated and an active set is determined for each query associated with that cursor variable (e.g., cursor pointer spaces 510 and 530, and active sets 520 and 540). Data (e.g., a physical pointer, a unique identifier, etc.) is stored in each cursor pointer space to indicate which active set it is associated with. For example, data is stored in the cursor pointer spaces 510 and 530 to indicate that they are respectively associated with the active sets 520 and 540. Since the queries associated with a cursor variable can differ, the active sets 520 and 540 can differ in any number of the above described ways, including: 1) the columns they contain; 2) the order of the columns they contain; 3) the rows they contain; and 4) the tables from which the data is accessed.

In addition, a space in memory is allocated for the cursor variable (e.g., cursor variable space 550). A cursor variable can be associated with only one query at any given time. Within the cursor variable space 550, data is stored to identify the query to which the cursor variable is currently associated. For example, if the cursor variable is associated with the first query, the cursor variable space 550 contains data (e.g., a physical pointer, a unique integer value, etc.) that identifies the cursor pointer space 510, and thus, indirectly identifies the active set 520. However, the cursor variable may subsequently be associated with the second query by overwriting the data stored in the cursor variable space 550 with data that identifies the cursor pointer space 530. These associations are illustrated by dashed lines running from the cursor variable space 550 to the cursor pointer spaces 510 and 530. In this manner, the active set associated with the cursor variable can be changed. Using this technique, the cursor variable space 550 contains data that indirectly points to the active set to which the cursor variable is currently associated.

While one embodiment of the invention has been described with reference to creating a separate active set for each query and having data in the cursor variable space indirectly point to the currently selected active set, alternative embodiments could use any number of mechanisms for changing the active set with which a cursor variable is associated. For example, in one alternative embodiment, a single active set could be created for each cursor variable. In such an embodiment, the server portion could simply alter/over-write that active set of the cursor variable each time a new query is selected. As another example, in another alternative embodiment, data could be stored in the cursor variable space that points directly to the currently selected active set, rather than using a cursor pointer space. Techniques for implementing and manipulating cursor variables shall now be described in greater detail.

Creating Cursor Variables

Statements for Creating Cursor Variables

In one embodiment of the invention, creating cursor variables requires two steps: 1) defining a REF CURSOR type; and 2) declaring cursor variables to be of that type. Defining REF CURSOR types and declaring cursor variables is done using the following syntax:

```
TYPE type_name IS REF CURSOR [RETURN return_type]; -- define
    REF--CURSOR type
cursor_variable_name type_name; -- declare cursor variable
``` where type_name is a type specifier used in subsequent declarations of cursor variables to declare cursor variables of the REF CURSOR type identified by type_name (e.g., cursor_variable_name), "--" indicates a comment, and return_type stands for the following syntax:

```
{    record_type
|   database_table%ROWTYPE
|   cursor_variable%ROWTYPE
|   cursor%ROWTYPE
|   record_variable%TYPE}
```

The optional RETURN clause is used for defining strong REF CURSOR types, which in turn are used for declaring strongly typed cursor variables. Thus, the return_type defines the row type (the data types and the order of the data types; also termed as the "return row type") that a row must be type-compatible with to be accessed using a strongly typed cursor variable (also referred to herein as a strong cursor variable).

As an example, the following statements will result in the creation of a strongly typed cursor variable named deptcv:

```
TYPE EmpRecType IS RECORD (
    empno NUMBER(4),
    ename CHAR(10),
    sal NUMBER (7,2));
TYPE EmpCurType IS REF CURSOR RETURN EmpRecType;
deptcv EmpCurType; --declare cursor variable
```

As shown above, a record type may be used to specify the return type of a cursor variable. In this case, the row type of the cursor variable deptcv is: NUMBER(4), CHAR(10), NUMBER (7,2).

In addition, the %ROWTYPE syntax can be used to specify a record type that represents a row returned by a database table as shown below:

```
TYPE DeptCurType IS REF CURSOR RETURN dept%ROWTYPE;
dept_cv DeptCurType;
``` where dept is a database table. Similarly, the %ROWTYPE syntax may be used for cursor variables or the static cursor construct. In addition, the %TYPE syntax can be used to provide the data type of a record variable as shown below:

```
dept_rec dept%ROWTYPE; --declare record variable
TYPE DeptCurType IS REF CURSOR RETURN dept_rec%TYPE;
dept_cv DeptCurType; --declare cursor variable
```

While several formats for defining the return_type are listed above, alternative embodiments could use more, less, or different structures to indicate the return_type.

Figure 6:
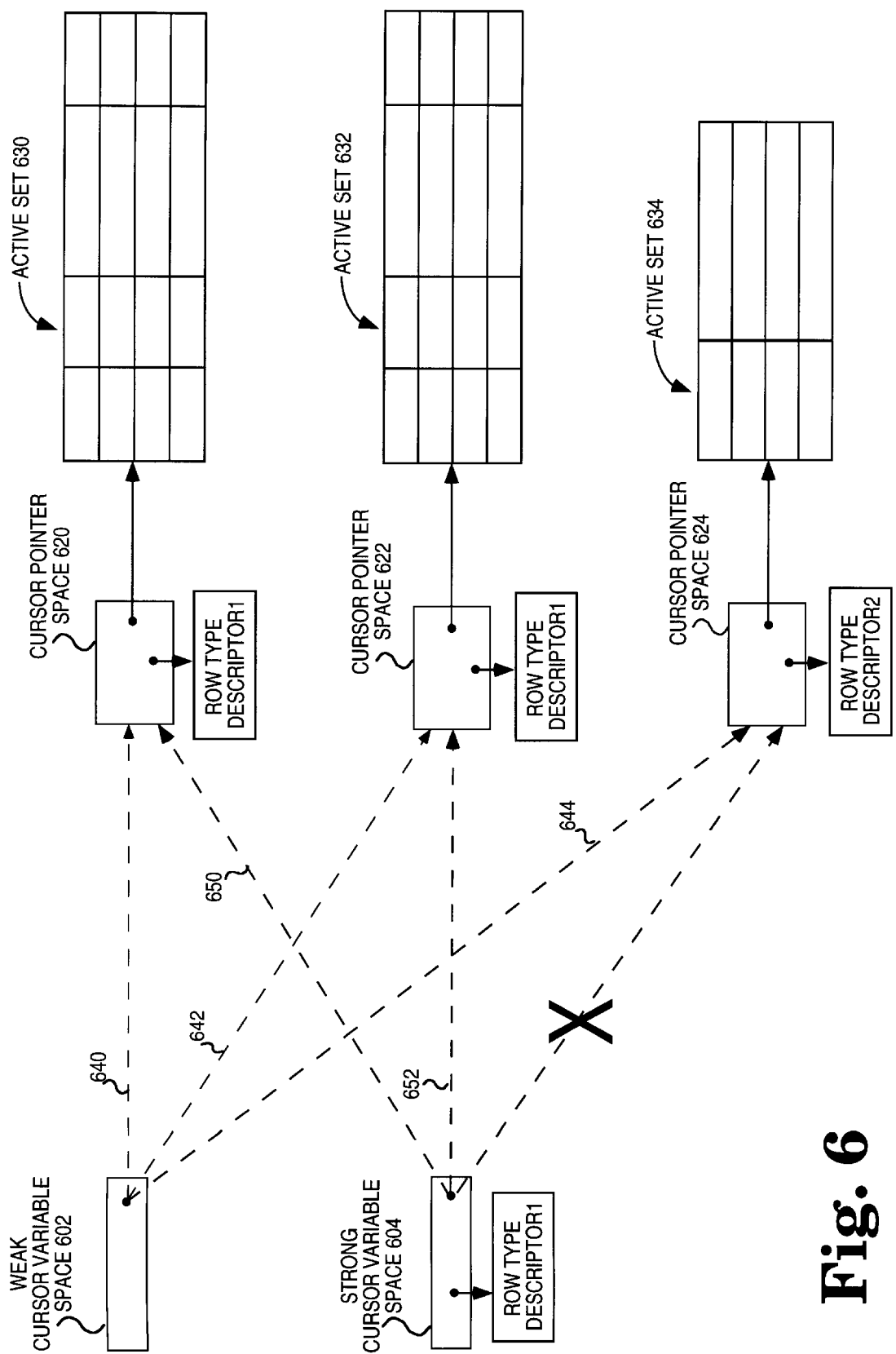
FIG. 6 is a block diagram illustrating certain possible associations of a strong and a weak cursor variable according to one embodiment of the invention.

FIG. 6 is a block diagram illustrating certain possible associations of a strong and a weak cursor variable according to one embodiment of the invention. FIG. 6 shows a weak cursor variable space 602 and a strong cursor variable space 604 for respectively storing data pertaining to a weak and a strong cursor variable. In addition, FIG. 6 shows a set of cursor pointer spaces 620, 622, and 624 storing data identifying their corresponding active sets 630, 632, and 634.

Each cursor pointer space has stored therein data (e.g., a physical pointer to a location containing a row type descriptor, a row type descriptor, etc.) for identifying the row type of the active set to which they correspond. In FIG. 6, the cursor pointer spaces 620 and 622 are shown storing a pointer to matching row type descriptors (row_type_descriptor1), while the cursor pointer space 624 is shown storing a pointer to a different row type descriptor (row_type_descriptor2).

In addition, the strong cursor variable space 604 also stores data (e.g., a physical pointer to a location containing a row type descriptor, a row type descriptor, etc.) for identifying the row type specified by the return type of the REF CURSOR statement used to define the type of that strong cursor variable. In FIG. 6, the row type of the strong cursor variable is the same as the row type of the active sets 630 and 632 (row_type_descriptor1). As a result, the row type for the strong cursor variable is type-compatible with the row types for the active sets 630 and 632. However, it is assumed that the row type of the strong cursor variable is not type-compatible with the row type of the active set 634. What is defined as a type-compatible row type is further described later herein.

Through the use of dashed lines, FIG. 6 also illustrates a number of associations between the weak and strong cursor variables and the various active sets. Since weak cursor variables can be associated with any query, dashed lines 640, 642, and 644 are shown running from the weak cursor variable space 602 to each of the cursor pointer spaces 620, 622, and 624, respectively. In contrast, the strong cursor variable can only be associated with type-compatible row types. Thus, the strong cursor variable in FIG. 6 can be associated with the active sets 630 and 632 as illustrated by the dashed lines 650 and 652 running from the strong cursor variable space 604 to the cursor pointer spaces 620 and 622. However, the strong cursor variable cannot be associated with the active set 634. The inability of the strong cursor variable to be associated with the active set 634 is illustrated by a dashed line that runs from the strong cursor variable space 604 to the cursor pointer space 624 having an "X" on it. The techniques for associating a cursor variable with a particular active set will be described later herein.

Compiling Statements for Creating Cursor Variables

Figure 7:
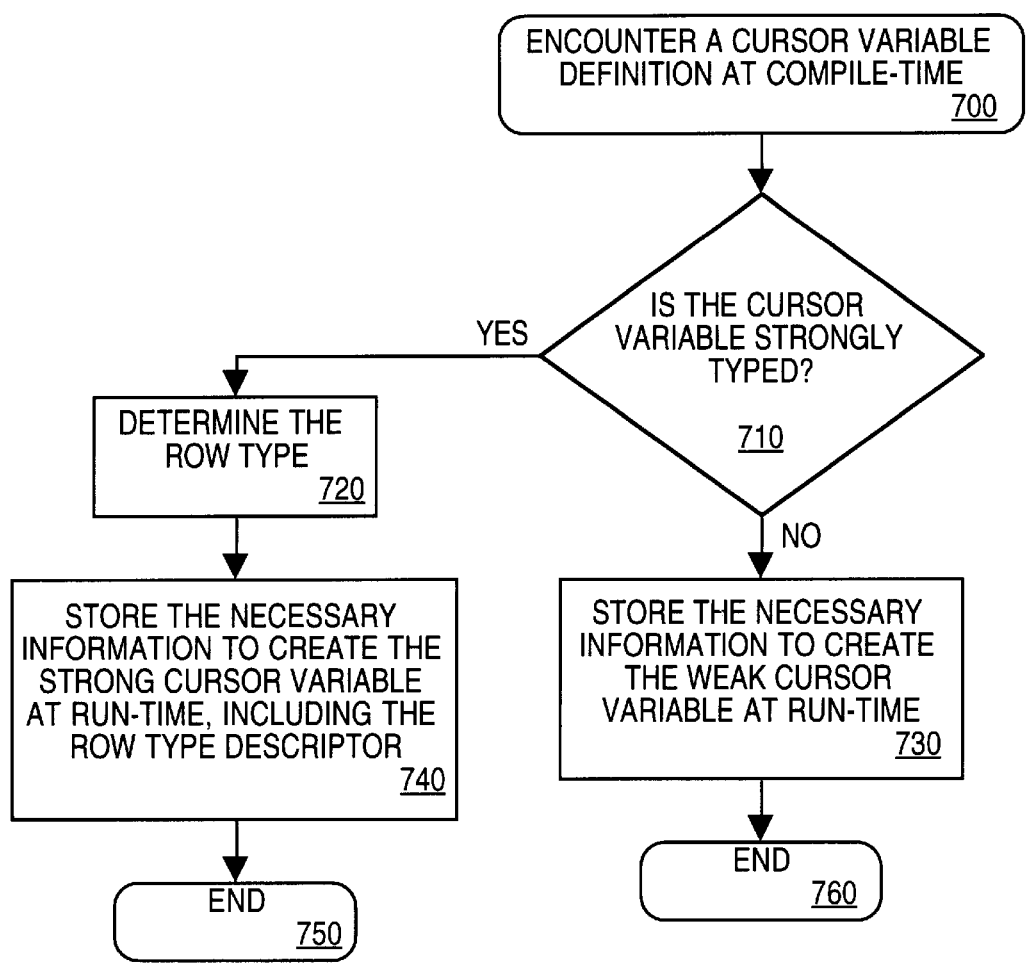
FIG. 7 is a flow diagram illustrating the steps performed by a compiler in response to encountering a cursor variable definition according to one embodiment of the invention.

FIG. 7 is a flow diagram illustrating the steps performed by a compiler in response to encountering a cursor variable definition according to one embodiment of the invention. As shown in step 700, a cursor variable definition is encountered and flow passes to step 710.

At step 710, it is determined if the cursor variable is strongly typed. This step is performed by parsing the REF CURSOR type definition statement to determine if a RETURN clause was included. If the cursor variable is strongly typed, flow passes to step 720. Otherwise, flow passes to step 730.

In step 720, the return row type of the strong cursor variable is determined. As previously described, this step is performed by determining the ordered plurality of data types that rows must match to be accessed using this strongly typed cursor variable. Determining the return row type of the strong cursor variable is accomplished by processing the RETURN clause of the REF CURSOR type definition statement. From step 720, flow passes to step 740.

At step 740, the necessary information to create the strongly typed cursor variable at run-time is stored in the executable code and flow passes to step 750. This information would include the row type descriptor determined in step 720. This row type descriptor is necessary for type checking during run-time as will be later described herein. At step 750, this branch of the flow diagram ends.

As shown in step 730, the necessary information to create the weak cursor variable at run-time is stored in the executable code. Since the weak cursor variable is not tied to any return row type, there is no row type descriptor to be stored. From step 730, flow passes to step 760, where this branch of the flow diagram ends. While one embodiment has been described that supports both strong and weak cursor variables, alternative embodiments may support only one cursor variable type.

Opening Cursor Variables

Statements for Opening Cursor Variables

Unlike the definition of static cursors, the definition of a cursor variable does not require a <sql query>. As a result, there is no query associated with a cursor variable when it is defined. In contrast, one embodiment supports an OPEN-FOR statement in which a <sql query>is used. Execution of an OPEN-FOR statement associates a cursor variable with a multi-row query, executes the query, and identifies the active set. Subsequently, different OPEN-FOR statements can open the same cursor variable for different queries. Thus, the OPEN-FOR statement is one way in which the various associations illustrated in FIG. 6 by the dashed lines 640, 642, 644, 650, and 652 may be created. Thus, the de-coupling of the query from the cursor variable definition allows for the flexibility illustrated in FIG. 4.

The syntax of the OPEN-FOR statement is as follows:

OPEN cursor_variable_name FOR <sql query>;

While one embodiment is described that supports explicit use of a <sql query>in an OPEN-FOR statement, alternative embodiment could alternatively or additionally support the use of a text string variable in place of the <sql query>(e.g., OPEN cursor_variable_name FOR string_variable_ name). During execution of an OPEN-FOR statement including such a text string variable, the text string variable would contain the text of a legal SQL query.

Compiling Open Statements for Cursor Variables

Figure 8:
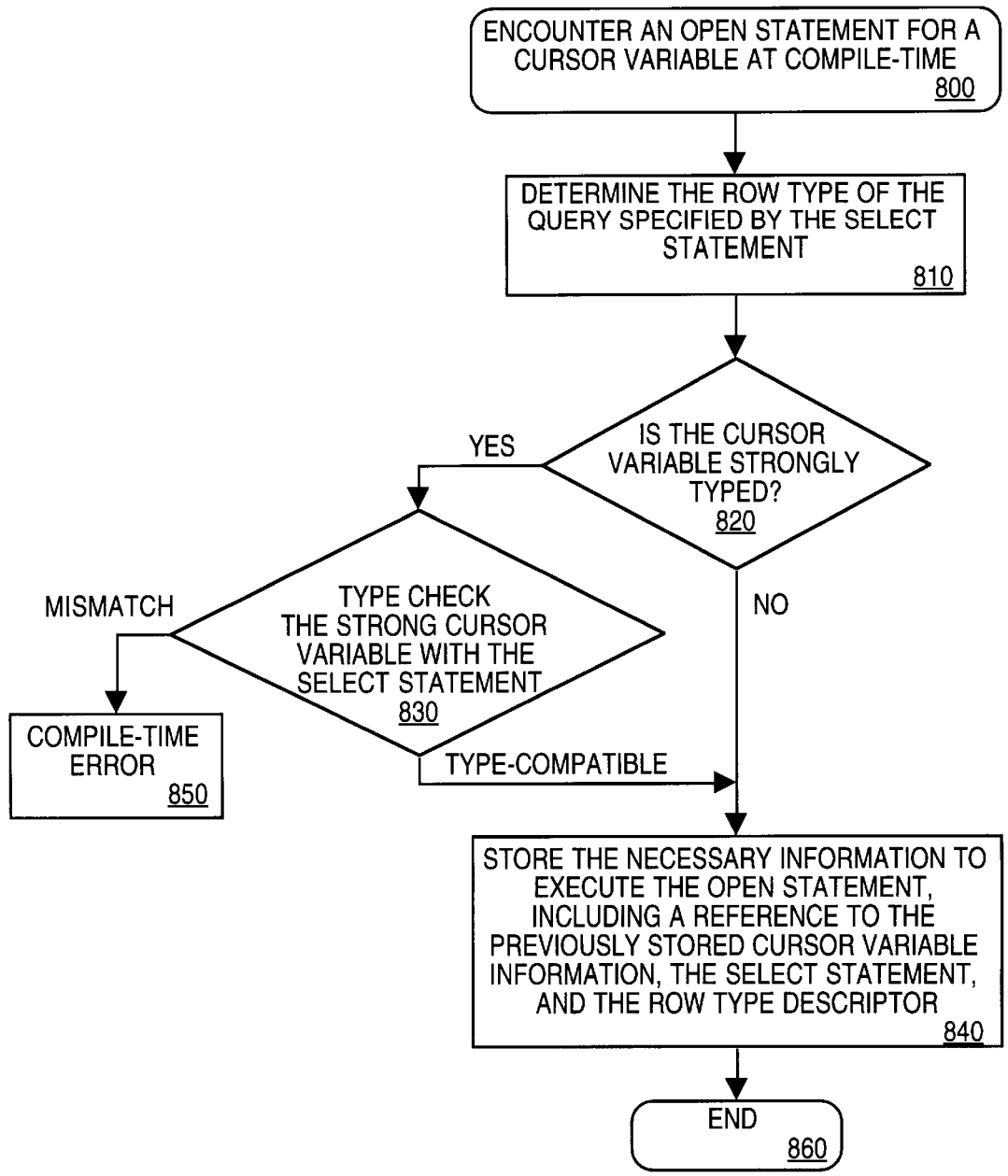
FIG. 8 is a flow diagram illustrating the steps performed by a compiler upon encountering an open statement for a cursor variable according to one embodiment of the invention.

FIG. 8 is a flow diagram illustrating the steps performed by a compiler upon encountering an open statement for a cursor variable according to one embodiment of the invention. The flow diagram starts at step 800 when an open statement for a cursor variable is encountered. From step 800, flow passes to step 810.

At step 810, the row type of the query specified by the select statement is determined. Techniques for performing this step are well known in the art. From step 810, flow passes to step 820.

As shown in step 820, it is determined if the cursor variable is strongly typed. If the cursor variable is strongly typed, flow passes to step 830. Otherwise, flow passes to step 850. To perform step 820, the OPEN-FOR statement is parsed to determine which cursor variable is involved. The compiler then accesses the information previously stored concerning the definition of this cursor variable to determine if the cursor variable is strongly typed.

At step 830, the row type of the strong cursor variable is type checked against the row type of the select statement. Since strong cursor variables can only be associated with type-compatible row types, step 830 is performed to determine if the row type of the query specified by the select statement is type-compatible with the row type of the strong cursor variable. To perform step 830, the row type descriptor for the cursor variable is compared with the row type descriptor for the select statement. In one embodiment, a "type-compatible query" is defined as requiring that the data types making up the row type of the select statement are identical to the corresponding data types making up the row type of the strong cursor variable (referred to herein as a "structural match"). In another embodiment, a type-compatible query is defined as requiring that the data types making up the row type of the select statement can at least be implicitly converted into the corresponding data types making up the row type of the strong cursor variable (a "convertible match" occurs when at least one implicit data type conversion is required). If the strong cursor variable and the query are determined to be type-compatible, then flow passes from step 830 to step 840. Otherwise, there is a row type "mismatch" and flow passes from step 830 to step 850 where a compile-time error message is generated. While in one embodiment, the permissible data type conversions are those supported by the current version of SQL (the various types of data conversions supported by SQL are well known in the art), alternative embodiments could support more, less, and/or different conversions.

To provide an example, the reader is again referred to FIG. 6. If an OPEN-FOR statement is encountered by the compiler that attempts to associate the strong cursor variable with a query that returns active set 634, a type mismatch would be detected and a compile-time error would be generated. In contrast, if an OPEN-FOR statement is encountered by the compiler that attempts to associate the strong cursor variable with a query that returns either active sets 630 or 632, no compile-time error would be generated.

At step 840, the necessary information to execute the open statement is stored in the executable code and flow passes to step 860 where the flow diagram ends. This information would include a reference to the previously stored cursor variable information, the text of the select statement (or a reference to a text string variable containing the text of a SQL query), and the row type descriptor.

As shown by the flow diagram in FIG. 8, type checking is performed for the strong cursor variable named in the OPEN-FOR statement. However, type checking is not performed for weak cursor variables because they are not restricted to a particular row type. In an alternative embodiment that supports the use of a text string variable in an OPEN-FOR statement, the type checking may be performed at the time of execution of the OPEN-FOR statement when the contents of the text string variable is available.

Executing Open Statements for Cursor Variables

Upon execution, the information stored in step 840 will cause the execution of the query, the identification of the active set, and the association of the active set with the cursor variable. As an example, assume that the association represented by the dashed line 640 from FIG. 6 is created as a result of an OPEN-FOR statement. In this example, execution of the OPEN-FOR statement would result in: 1) the creation of active set 630; 2) the creation of the cursor pointer space 620; 3) the storing of data identifying the active set 630 and the row type of the active set 630 (e.g., row type descriptor1) in the cursor pointer space 620; and 4) the storing of data identifying the cursor pointer space 620 in the weak cursor variable space 602.

In one embodiment in which a cursor variable may be reopened, the reopening of an existing cursor variable is performed by generating a new active set and updating the data stored in the existing cursor variable space and the existing cursor pointer space as necessary to identify the new active set (i.e., the existing cursor variable space and the existing cursor pointer space are reused). For example, assume the association illustrated by the dashed line 640 was established and the weak cursor variable in FIG. 6 was reopened (e.g., another OPEN-FOR statement was executed using a different query). In an embodiment that reuses the cursor variable space and the cursor pointer space, the new query is executed, the data in the cursor pointer space is updated to identify the new active set that resulted from the execution of the new query, and the row type descriptor is updated to describe the rows in the new active set.

Assigning Cursor Variables
Statements for Assigning Cursor Variables

In one embodiment, a first cursor variable can be associated to the same active set as a second cursor variable. In this embodiment, the following syntax is used:

cursor_variable2 :=cursor_variable1;

To provide an example, the reader will again be referred to FIG. 6. For purposes of this example, it is assumed that the strong cursor variable is associated with the active set 630—the association illustrated by the dashed line 650. As a result, assigning the strong cursor variable to the weak cursor variable would result in causing the weak cursor variable to be associated with the active set 630. In one embodiment, this association is simply performed by copying the data that identifies the cursor pointer space 620 stored in the strong cursor variable space 604 into the weak cursor variable space 602. Thus, the concept of assigning cursor variables is similar to the concept of assigning pointers in high-level programming languages, and to assigning object references in object-oriented languages.

As a further example, assume that after the associations illustrated by the dashed lines 640 and 650 were created, the weak cursor variable in FIG. 6 was reopened. As previously described, one embodiment is implemented to reuse the cursor variable space and the cursor pointer space when a cursor variable is reopened. In this embodiment, the new query is executed, the data in the cursor pointer space 620 is updated to identify the new active set (not shown) that resulted from the execution of the new query, and the row type descriptor is updated to describe the rows in the new active set. Since the data in the weak cursor variable space 602 and the strong cursor variable space 604 still identify the same cursor pointer space 620, both the weak and the strong cursor variables are associated with the new active set. In other words, the reopening of a cursor variable causes all cursor variables associated with the same active set to be associated with the new active set.

This reassociation of multiple cursor variables by reopening a single cursor variable creates the need for additional type checking. As previously described, one embodiment is implemented to perform compile-time type-checking if the cursor variable specified in an the OPEN-FOR statement is a strong cursor variable. However, type-checking is not performed at compile-time for strong cursor variables that are not specified in the OPEN-FOR statements but which are associated with a new active set as a result of the reopening of another cursor variable. For example, again assuming the associations shown by the dashed lines 640 and 650 are established and the weak cursor variable is reopened, the reassociation of the strong cursor variable with the new active set is not type-checked at compile-time. In contrast, the strong cursor variable is type-checked with the row type of the new active set at run-time by comparing the row type descriptor associated with the strong cursor variable with the row type descriptor of the new active set. In one embodiment this run-time type-checking is performed upon execution of the OPEN-FOR statement that results in the reopening of the cursor variables. In an alternative embodiment, this run-time type-checking is performed only if required. For example, this run-time type-checking is required to execute statements that involve using the strong cursor variable to access data from the new active set (e.g., a FETCH statement), but is not required to execute an OPEN-FOR statement or a CLOSE statement.

While one embodiment has been described in which cursor variable assignments result in aliasing, alternative embodiments could implement the assignment of cursor variables to act like the assignment of other variables. For example, assigning a first cursor variable associated with a first active set to a second cursor variable would result in the second cursor variable being associated with an independent copy of the first active set.

Table 4 illustrates the four possible combinations of assignments between strong and weak cursor variables. Since weak cursor variables can be associated with any query, no type checking is required for assignments to weak cursor variables (cases 1 and 2 from Table 4). However, since strongly typed cursor variables can only be associated with type-compatible queries, assignments to strong cursor variables must be type checked (cases 3 and 4 from Table 4).

TABLE 4

| Case | Combination |
|------|-------------|
| 1 | weak_cursor_variable1 = weak_cursor_variable2; |
| 2 | weak_cursor_variable = strong_cursor_variable; |
| 3 | strong_cursor_variable = weak_cursor_variable; |
| 4 | strong_cursor_variable1 = strong_cursor_variable2; |

As previously described, assigning a cursor variable to another cursor variable results in aliasing. Due to aliasing, the two cursor variables identify the same result set and the same current row in that result set. If one cursor variable is used to advance the current row, both cursor variables will reflect the same result set and current row. The concept of aliasing is not supported by static cursors, dynamic cursors, result set constructs, or collections. Since aliasing is not possible, these prior art constructs suffer from the following limitations: 1) at different times the same query may return different sets of rows if any database object specified in the query is altered by the same or another program executing within the same transaction; and 2) creating multiple constructs for the same query consumes significant time and memory, whereas the assignment of a cursor variable only requires making the cursor variable point to a previously evaluated result set.

Compiling Assignment Statements for Cursor Variables

Figure 9:
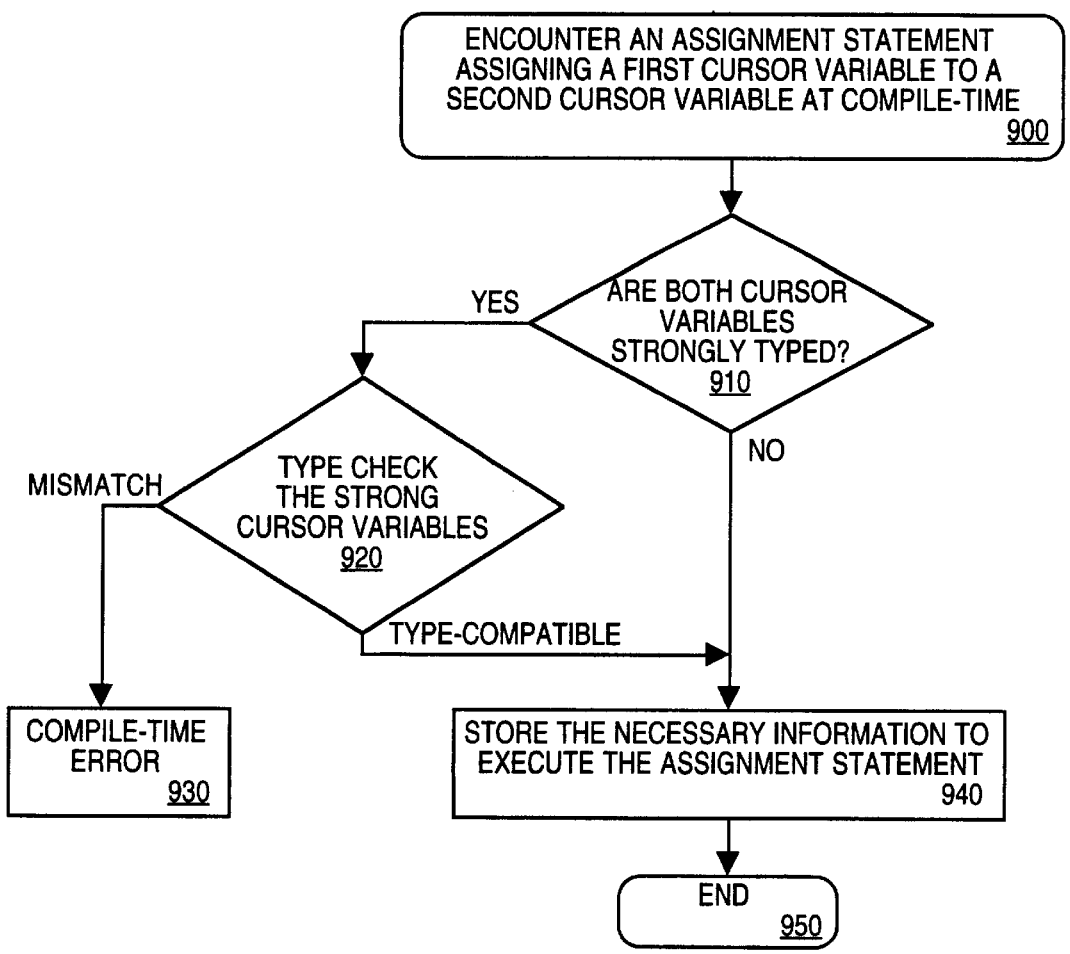
FIG. 9 is a flow diagram illustrating the steps performed by a compiler in response to encountering an assignment statement assigning a first cursor variable to a second cursor variable according to one embodiment of the invention.

FIG. 9 is a flow diagram illustrating the steps performed by a compiler in response to encountering an assignment statement assigning a first cursor variable to a second cursor variable according to one embodiment of the invention. The flow diagram starts at step 900, from which flow passes to step 910.

As shown in step 910, it is determined if both cursor variables are strongly typed (case 4 from Table 4). If both cursor variables are strongly typed, flow passes to step 920. Otherwise, flow passes to step 930. The types of the cursor variables are determined by polling the information previously stored concerning the cursor variables in response to compiling the respective definition statements for the cursor variables.

At step 920, the strong cursor variables are type checked to determine if the row types of the strong cursor variables are compatible. Step 920 is performed by comparing the row type descriptors previously stored in response to compiling the respective definition statements for the cursor variables. In one embodiment, a "type-compatible assignment" requires the strong cursor variables be of the same REF CURSOR type (referred to herein as a "declaration type match"). In alternative embodiments, a type-compatible assignment could require at least a structural match or at least a convertible match. If the strong cursor variables are determined to be type-compatible, then flow passes from step 920 to step 940. Otherwise, there is a mismatch and flow passes from step 920 to step 930 where a compile-time error message is generated.

In step 940, the information necessary to execute the assignment statement is stored in the executable code and flow passes to step 950 where the flow diagram ends. This information would include references to the information stored in response to compiling the respective definition statements of the cursor variables. In an embodiment that supports convertible matches, this information also includes the necessary code to perform any implicit data type conversions that are or may be required.

As illustrated by FIG. 8, assignments from one strong cursor variable to another strong cursor variable are type checked at compile-time in one embodiment of the invention. This type checking can be performed because the compiler has already determined the row types associated with both strong cursor variables. In contrast, there are no row type descriptors permanently associated with weak cursor variables. As a result, the row type descriptor for a cursor variable depends upon the active set to which that cursor variable is currently associated. For example, the weak cursor variable in FIG. 6 will have a different row type descriptor when it is associated with active set 630 (e.g., row type descriptor1) than when it is associated with active set 634 (e.g., row type descriptor2). Thus, a row type descriptor is not associated with a weak cursor variable until an appropriate OPEN-FOR or assignment statement is executed. Furthermore, this row type descriptor may change if a subsequent OPEN-FOR or assignment statement is executed.

Since executable code does not necessarily execute sequentially, branches from different areas in a program may lead to an assignment statement assigning a weak cursor variable to a strong cursor variable (case 3 in Table 4). These different areas of the program may associate this weak cursor variable with different active sets. As a result, it is unknown at compile-time what the row type of that weak cursor variable will be. Therefore, type checking assignment statements involving weak cursor variables when the row type is undetermined cannot be accurately performed at compile-time. To this end, one embodiment of the invention performs type checking for assignments from weak cursor variables to strong cursor variables during run-time, as opposed to during compile-time.

Executing Assignment Statements for Cursor Variables

A technique for performing type checking during run-time will be described with reference to FIG. 6. For purposes of this example, it is assumed that there is an assignment statement assigning the weak cursor variable to the strong cursor variable. If the weak cursor variable is currently associated with the active set 630, the row type of the weak cursor variable is described by row type descriptor 1. Upon attempting to assign the weak cursor variable to the strong cursor variable, the data stored in the weak cursor variable space 602 is used to identify the cursor pointer space 620. Then, the data stored in the cursor pointer space 620 is used to locate the previously stored row type descriptor for the active set 630 (row type descriptor1). In addition, the data stored in the strong cursor variable space 604 is used to locate the row type descriptor for the strong cursor variable (row type descriptor1). The identified row type descriptors are then compared to determine if the row types are type-compatible. In the present example, the row types are type-compatible and the assignment would not result in a run-time error message being generated. In contrast, if the weak cursor variable was associated with the active set 634, a run-time error would be generated because the row types would not be type-compatible. Any such run-time error could be handled using the usual mechanism of error handling (also termed as exception handling). For example, the client application could include exception handling code to be executed upon the occurrence of a row type mismatch error being generated.

While one embodiment is described in which the type checking for assignments from one strong cursor variable to another strong cursor variable is performed at compile-time, alternative embodiments could perform this type checking at run-time using the technique described with reference to assignments from a weak cursor variable to a strong cursor variable. Furthermore, alternative embodiments may be implemented to perform type-checking for assignments from one strong cursor variable to another strong cursor variable at both compile-time and at run-time. Due to the nature of how aliased cursor variables may be reopened, embodiments that are implemented to perform type-checking for assignments from one strong cursor variable to another strong cursor variable at run-time may be implemented to ensure that both the cursor variables in the assignment are compatible with the active set.

While one embodiment is described which supports the four cases of assignments in Table 4, alternative embodiment may support only some of these assignments. In addition, while one embodiment has been described in which the compiler does not perform type checking on assignments from weak cursor variable to strong cursor variables, alternative embodiments could attempt to provide some type checking for this case at compile-time. For example, a compiler may be implemented to determine all possible paths of execution for the program, and then try to determine all possible row types the weak cursor variable could be associated with upon reaching the assignment statement during execution. If the compiler could positively identify all possible row types the weak cursor variable could be associated with, the compiler would either: 1) generate a compile-time error if there was a row type mismatch; or 2) not generate a compile-time error if all the row types matched. Otherwise, the compiler would indicate a possible row type mismatch may occur at run-time.

Fetching from Cursor Variables

Statements for Fetching From Cursor Variables

Once a cursor variable is associated with the active set that satisfies a particular multi-row query, FETCH statements can be used to retrieve rows from the active set. The syntax for the FETCH statement according to one embodiment of the invention is:

FETCH cursor_variable_name INTO {record_name | variable_name[, variable_name, . . . ] | collection_name};

The text starting with "INTO" is referred to herein as the into-clause. One embodiment of the invention is implemented such that the into-clause of a FETCH statement may be a list of simple variables, a composite type, or a collection of identical data structures (e.g., an array of records). In response to such a FETCH statement in which the into-clause contains a collection of identical data structures, the server portion returns as many rows as will fit into the collection of identical data structures as a "bulk" fetch.

Compiling Fetch Statements for Cursor Variables

Figure 10:
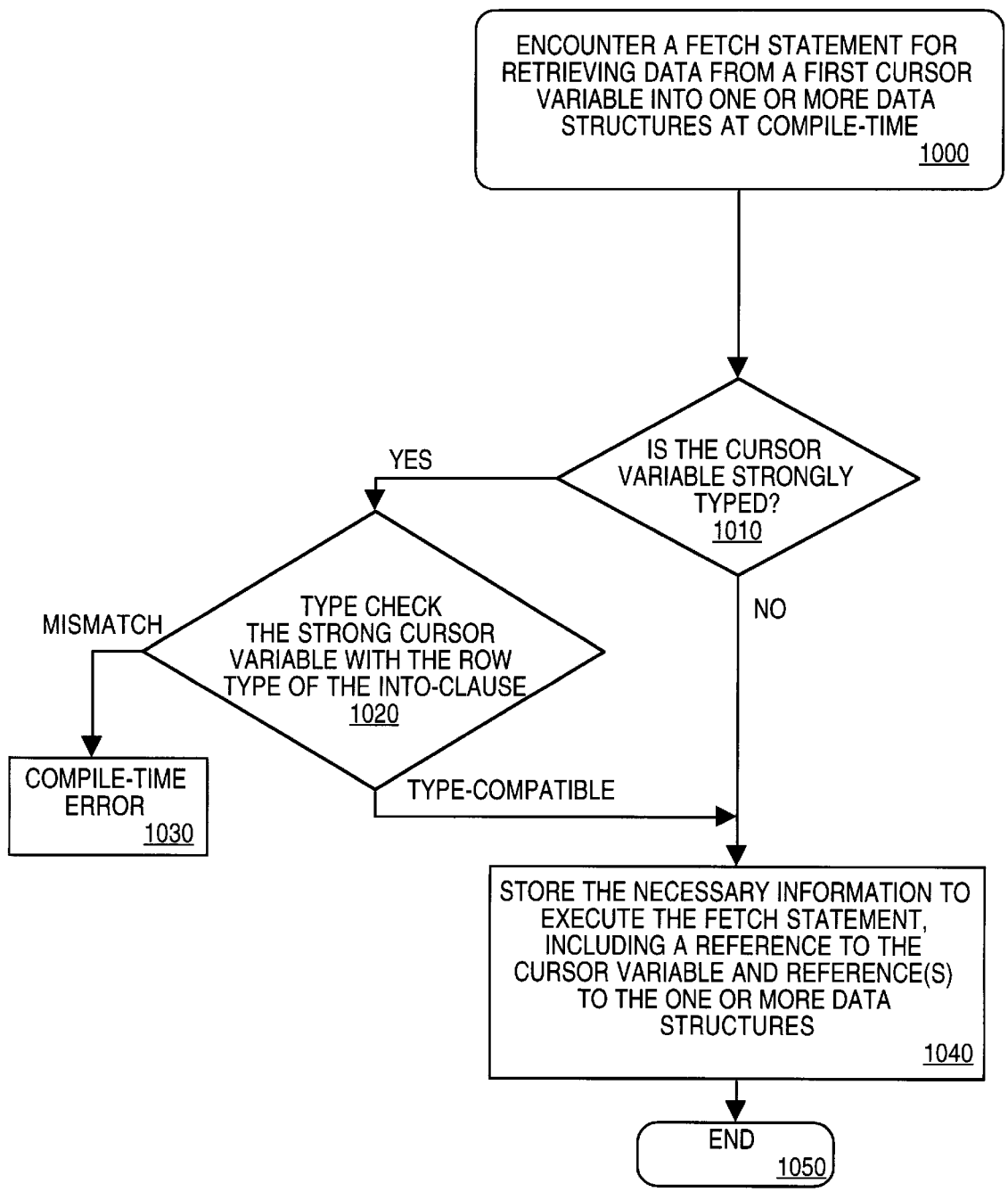
FIG. 10 is a flow diagram illustrating the steps performed by a compiler in response to encountering a fetch statement that requires fetching from a cursor variable into one or more data structures according to one embodiment of the invention.

FIG. 10 is a flow diagram illustrating the steps performed by a compiler in response to encountering a FETCH statement that requires fetching data from the active set associated with a cursor variable into one or more data structures (e.g., a list of simple variables, a composite type, etc.) according to one embodiment of the invention. The flow diagram starts at step 1000, from which flow passes to step 1010.

As shown in step 1010, it is determined if the cursor variable is strongly typed. Step 1010 is performed in the same manner as similar steps previously described herein. If the cursor variable is strongly typed, flow passes to step 1020. Otherwise, flow passes to step 1040.

At step 1020, the strong cursor variable is type checked against the row type of the into-clause. The row type of the into-clause is defined by the ordered plurality of data types of the variables or fields in the one or more data structures. For example, if the one or more data structures is defined by a list of variables, the data types of those variables and the order in which those variables are listed will define the ordered plurality of data types that must be compared to the row type of the strong cursor variable. Thus, the number of variables or fields must equal the number of fields in the row type associated with the strong cursor variable. In addition, for each field in the row type associated with the cursor variable, there must be a corresponding, type-compatible variable or field in the into-clause. While one embodiment is described in which "a type-compatible fetch" is defined as requiring at least a convertible match, alternative embodiments could require something different (e.g., a structural match). If the row types of the strong cursor variable and the into-clause are determined to be type-compatible, then flow passes from step 1020 to step 1040. Otherwise, there is a "mismatch" and flow passes from step 1020 to step 1030 where a compile-time error message is generated.

As shown in step 1040, the necessary information to execute the FETCH statement is stored in the executable code and flow passes to step 1050 where the flow diagram ends. This information would include a reference (e.g., a physical pointer) to the cursor variable, the necessary reference(s) to the one or more data structures, and a row type descriptor identifying the order and the data types defined by the one or more data structures.

Executing Fetch Statements for Cursor Variables

Figure 11:
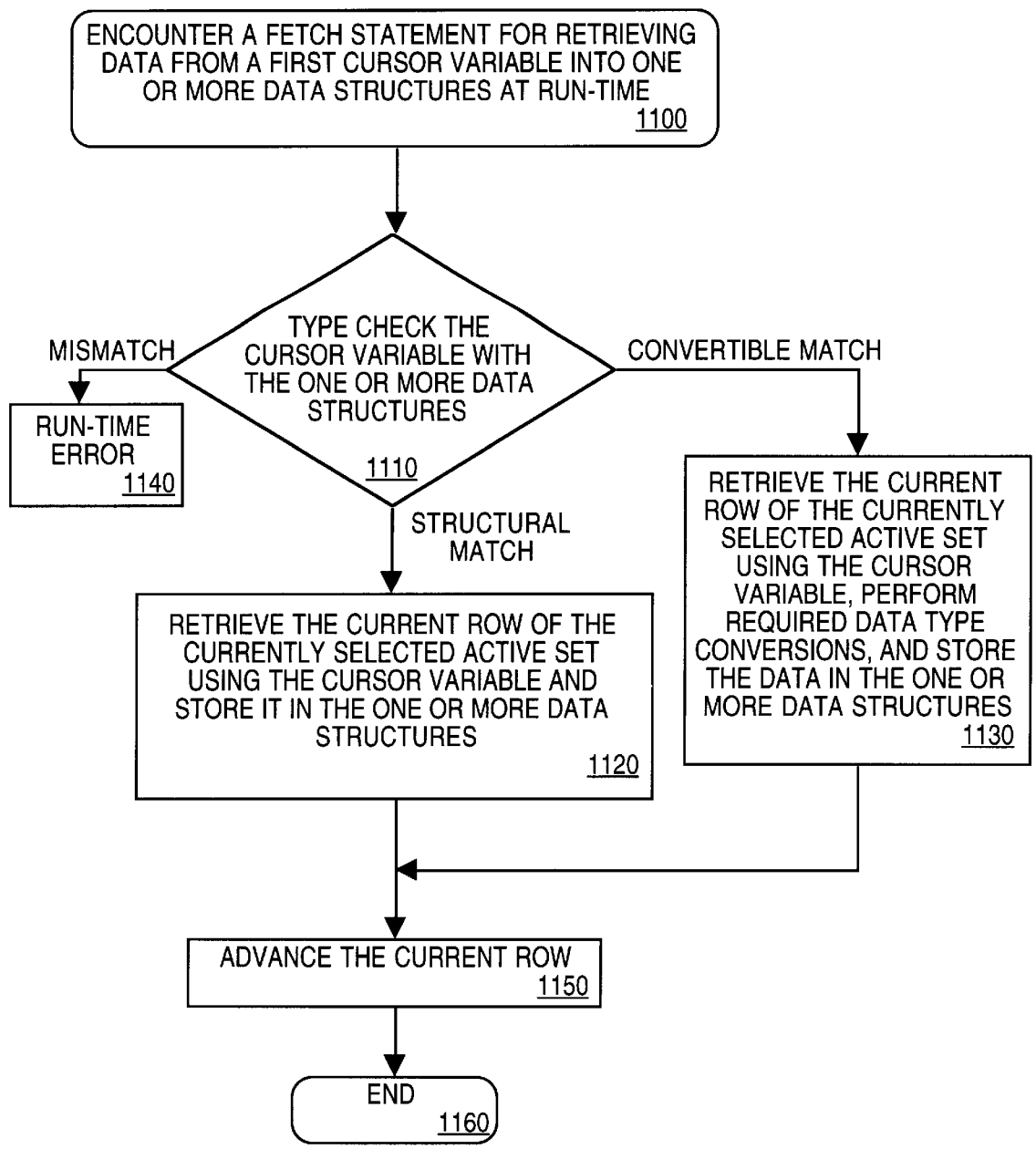
FIG. 11 is a flow diagram illustrating the steps performed during run-time when executing a FETCH from a cursor variable into one or more data structures according to one embodiment of the invention.

FIG. 11 is a flow diagram illustrating the steps performed during run-time when executing a FETCH from a cursor variable into one or more data structures according to one embodiment of the invention. The flow diagram begins at step 1100, from which flow passes to step 1110.

At step 1110, the row type currently associated with the cursor variable is compared to the data types defined by the one or more data structures. For a weak cursor variable, the row type is determined by identifying the row type of the active set to which it is currently associated. For a strong cursor variable, the row type may be determined by either: 1) identifying the row type of the active set to which the strong cursor variable is currently associated; or 2) accessing the row type descriptor identified by data stored in the cursor variable space corresponding to the cursor variable. Due to the nature of how aliased cursor variables may be reopened, embodiments may be implemented to also type-check the row types of the strong cursor variable and the active set currently associated with that strong cursor variable to ensure that the strong cursor variable has not been reassociated with an incompatible active set.

The row type determined for the cursor variable is compared to the row type descriptor for the one or more data structures previously stored by the compiler in step 1040. If there is a structural match, code is executed that causes the processor to retrieve the current row from the active set currently associated with the cursor variable and store the data in the one or more data structures (step 1120). However, if there is a convertible match, code is executed that causes the processor to retrieve the current row of the active set currently associated with the cursor variable, perform the required data type conversions, and store the resulting data in the one or more data structures (step 1130). If there is not a structural match or a convertible match, a type mismatch has occurred and a run-time error is generated (step 1140, where this branch of the flow diagram ends). Control passes from both step 1120 and 1130 to step 1150.

In one embodiment, an indication is stored by the compiler during step 1040 of FIG. 10 for strongly typed cursor variables indicating whether there was a structural match or a convertible match (a mismatch would have resulted in a compile-time error). In such a case, this indication could be inspected in step 1110 rather than re-comparing the row type of the strong cursor variable with the row type descriptor for the one or more data structures.

At step 1150, the current row pointer is advanced (the row that follows the current row becomes the new current row) and flow is passed to step 1160 where the flow diagram ends. This step is performed in a similar manner to static cursors.

As shown above, strong cursor variables are type checked at compile-time. Of course, alternative embodiments could be implemented to perform the type checking for strong cursor variables at run-time in a similar manner. The type checking for weak cursor variables is performed at run-time because the row type descriptor for a weak cursor variable may be undefined at compile-time. Of course, alternative embodiments could be implemented to attempt to determine the possible row types for a weak cursor variable and perform the type checking in a similar manner to that previously described.

As previously described, in one embodiment cursor variables introduce the possibility of aliasing. For example, both the strong and the weak cursor variable of FIG. 6 can be associated with the same active set (e.g., the active set 630) using an assignment statement. As a result, both cursor variables can be used to alter the state of the work area (e.g., perform a fetch). Thus, if a fetch is performed using the weak cursor variable that results in retrieving the first row, a subsequent fetch using the strong cursor variable will result in retrieving the second row, and so on.

While one embodiment has been described in which cursor variables are aliased, alternative embodiments could implement the assignment of cursor variables in any number of ways. For example, the assignment of cursor variables could be implemented to act like the assignment of variables as previously described. In such an embodiment, assigning a first cursor variable associated with a first active set to a second cursor variable would result in the second cursor variable being associated with an independent copy of the first active set. As another example, an embodiment could be implemented in which cursor variables share an active set, but have separate current row pointers. In such an embodiment, assigning a first cursor variable associated with a first active set to a second cursor variable would result in the second cursor variable being associated with an independent cursor pointer space. Within the independent cursor pointer space there would be copied the same data from the cursor pointer space of the first cursor variable. Since separate cursor pointer spaces are used, accesses from one cursor variable would not affect accesses for the other.

Passing Cursor Variables as Arguments Between Routines

In one embodiment of the invention, cursor variables can be passed between routines as arguments. This includes the passing of cursor variables between routines in the same client, between routines in different servers, between routines in the same server, and between a routine in a client and a routine in a server. In one embodiment, the passing of cursor variables as arguments is performed in a similar manner to the passing of pointers as arguments in other languages.

Figure 12:
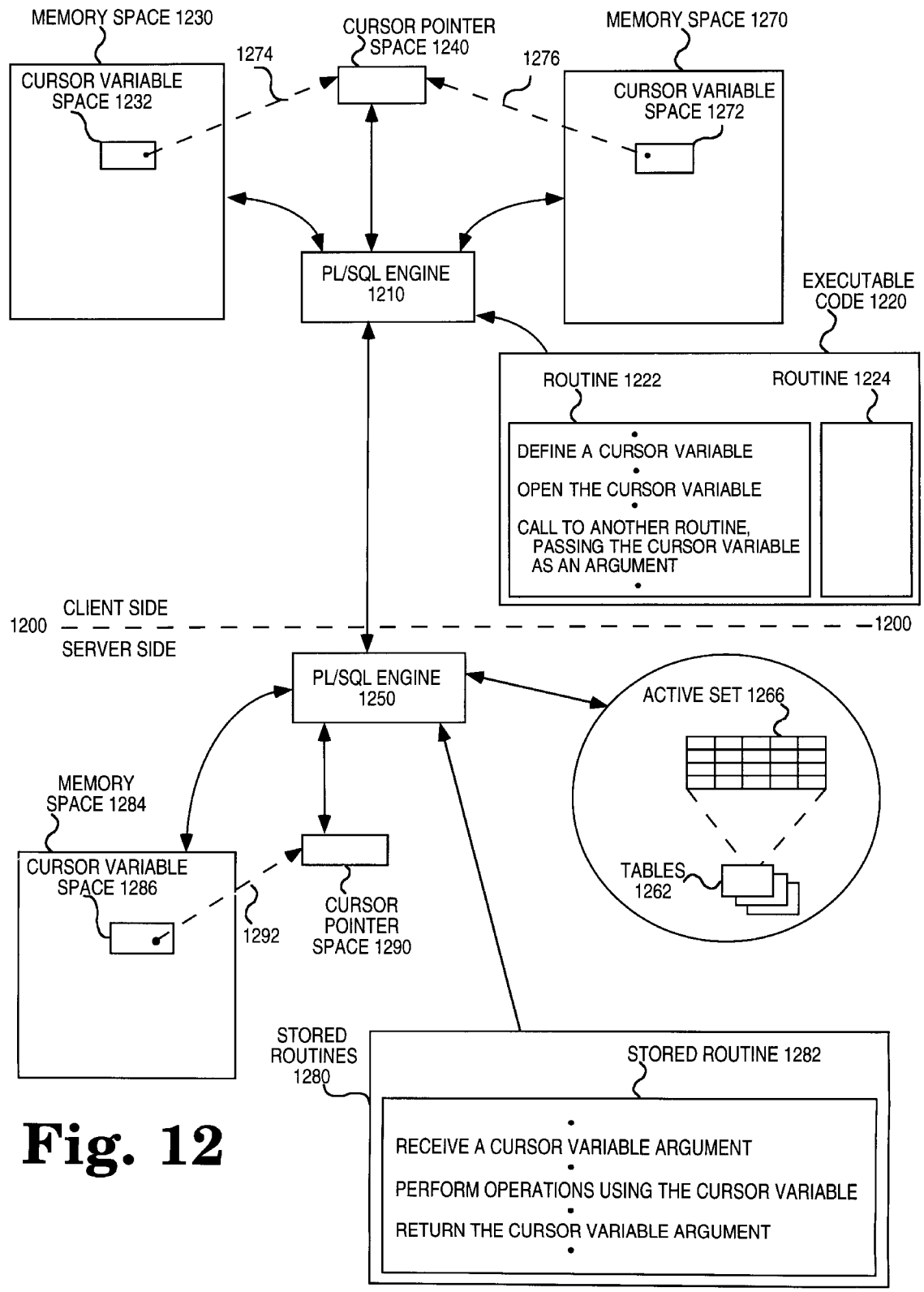
FIG. 12 is a block diagram illustrating the passing of cursor variables as arguments to a routine in an exemplary database according to one embodiment of the invention.

FIG. 12 is a block diagram illustrating the passing of cursor variables as arguments in an exemplary database according to one embodiment of the invention. FIG. 12 shows a line 1200 dividing the database architecture into a client side and a server side. On the client side, there resides a PL/SQL engine 1210 and executable code 1220. The executable code 1220 includes a routine 1222 and a routine 1224. Of course, the executable code 1220 includes additional code which is not necessary to understanding the invention. In response to commands from the user on the client side, the routine 1222 is executed using the PL/SQL engine 1210.

In response to executing the routine 1222, the PL/SQL engine 1210 opens a memory space 1230 for executing the routine 1222. Since the routine 1222 includes a definition of a cursor variable, the PL/SQL engine 1210 generates a cursor variable space 1232 for storing data to associate the corresponding cursor variable with an active set of data that satisfies a query. In response to executing an OPEN-FOR statement in routine 1222, the PL/SQL engine 1210 creates a cursor pointer space 1240. In addition, the PL/SQL engine 1210 passes the query to the server side for execution.

The server side includes a PL/SQL engine 1250 and a set of tables 1262. Of course, the server side may include additional items to those shown in FIG. 12 which are not necessary to understanding the invention. For purposes of this description, it can be assumed that the PL/SQL engine 1250 is identical to the PL/SQL engine 1210. In response to receiving the query from the PL/SQL engine 1210, the PL/SQL engine 1250 will cause the active set 1266 to be generated. In addition, a unique identifier is associated with the active set 1266. The identifier for the active set is sent back to the PL/SQL engine 1210. In response to receiving this identifier, the PL/SQL engine 1210 stores the identifier of the active set in the cursor pointer space 1240 for use in performing database accesses. In this manner, the cursor variable is linked to the active set 1266.

The routine 1222 is shown including a call to another routine. This call requires the passing of the cursor variable as an argument. As previously stated, this call can be to another routine in this client or to a routine in the server (e.g., a stored routine). For purposes of explanation, it will first be assumed this call is to another routine in the same client (e.g., the routine 1224). In response to executing this call, the PL/SQL engine 1210 will allocate another memory space (memory space 1270) for executing the routine 1224. Since the cursor variable was passed as an argument, the PU/SQL engine 1210 will also create a cursor variable space 1272 within the memory space 1270 for storing data to associate the cursor variable with the currently selected query. In this example, the routine 1222 has already associated the cursor variable with the active set 1266 as indicated by the dashed line running from the cursor variable space 1232 to the cursor pointer space 1240. As a result, the data stored in the cursor variable space 1232 that identifies the cursor pointer space 1240 will be copied into the cursor variable space 1272. As a result, the data stored in the cursor variable space 1272 will identify the cursor pointer space 1240 as shown by the dashed line 1276. Upon completion of the routine 1224, the contents of the cursor variable space 1272 are copied into the cursor variable space 1232.

It will now be assumed that the call in routine 1222 was to a stored routine on the server side. FIG. 12 also shows that the server side includes a set of stored routines 1280, including a stored routine 1282. Of course, the set of stored routines 1280 may include additional stored routines which are not necessary to understanding the invention. For purposes of this example, it is assumed that the call in routine 1222 is to the stored routine 1282.

A call from the client side to a stored routine on the server side is referred to herein as a remote routine call (RRC) (a remote routine call to a stored procedure is referred to as a remote procedure call, while a remote routine call to a function is referred to as a remote function call). In response to executing this call, the PL/SQL engine 1210 will send the RRC to the PL/SQL engine 1250. In response to receiving this RRC, the PL/SQL engine 1250 will execute the stored routine 1282. To execute the stored routine 1282, the PL/SQL engine 1250 will allocate a memory space 1284 for executing the stored routine 1282. Since the cursor variable was passed as an argument to the stored routine 1282, a cursor variable space 1286 will be allocated within the memory space 1284 for storing data to associate the cursor variable with the active set 1266. In addition, the PL/SQL engine 1250 will copy the contents of the cursor variable space 1232 into the cursor variable space 1286, with the exception of the data that identifies the cursor pointer space 1240. Furthermore, the PL/SQL engine 1250 will allocate a cursor pointer space 1290 on the server side. The PL/SQL engine will copy into this cursor pointer space 1290 the contents of the cursor pointer space 1240, including the identifier used to identify the active set 1266. The PL/SQL engine 1250 will then store data in the cursor variable space 1286 to identify the cursor pointer space 1290 as illustrated by the dashed line 1292. In this manner, the cursor variable on the server side is associated with the active set 1266. Upon completion of the stored routine 1282, the contents of: 1) the cursor variable space 1286 are copied into the cursor variable space 1232, with the exception of the data that identifies the cursor pointer space 1290; and 2) the contents of the cursor pointer space currently identified by the contents of the cursor variable space 1286 (the cursor pointer space 1290 if no assignments occurred) are copied into the cursor pointer space 1240.

As described above, cursor variables are passed back from the called routine to the calling routine in a similar manner. If in the calling routine a cursor variable argument has already been associated with a cursor pointer space (1240), no new cursor pointer space is created upon return, but the existing one is reused and updated, as needed. For example, assume that the execution of routine 1222 has not resulted in the association of the cursor variable with a query (i.e., an OPEN-FOR statement was not executed during the execution of routine 1222 prior to the call to stored routine 1282, the cursor pointer space 1240 has not been allocated, the cursor variable space 1232 does not contain data pointing to a cursor pointer space) prior to calling the stored routine 1282 and that the execution of stored routine 1282 results in the execution of an OPEN-FOR statement for the cursor variable. In this example, the execution of the OPEN-FOR statement in the stored routine 1282 would result in the creation of the cursor pointer space 1290, the cursor pointer space 1240 would be allocated upon return from the stored routine 1282, and the contents of the cursor pointer space 1290 would be copied into the cursor pointer space 1240.

The above examples concerning the passing of arguments assumes that the argument was being passed from the routine 1222 into the other routines, as well as passed back from the called routines to the routine 1222. In fact, there are three basic ways to pass an argument: 1) passing the argument from the calling routine to the called routine, but not back from the called routine to the calling routine upon completion of the called routine (referred to as an IN argument); 2) passing the argument from the calling routine to the called routine, as well as back from the called routine to the calling routine upon completion of the called routine (referred to as an IN/OUT argument); and 3) only passing the argument from the called routine back to the calling routine (referred to as an OUT argument or function return value).

The passing of cursor variables as arguments on the sever side is implemented in the same manner as on the client side. While one embodiment has been described in which cursor variables may be passed between the various entities in the database architecture (e.g., within a client, within a server, server to server, client to server), alternative embodiments may support less than all of these argument passing capabilities.

In addition, alternative embodiment may pass cursor variables using any number of techniques (e.g., by value, by reference, etc.). For example, an embodiment could be implemented to pass the address of a cursor variable space as the argument. As another example, an embodiment could be implemented to pass the address of the cursor pointer space as the argument. As another example, the called or the calling routine could be responsible for allocating a scratch cursor variable space (e.g., cursor variable space 1272) for use during the execution of the called routine. The value stored in this scratch cursor variable space would then be passed back to the calling routine upon completion of the called routine and stored in the cursor variable space 1232. As another example, the scratch cursor variable space could be used only for cursor variables declared to be OUT or IN/OUT arguments, while the original cursor pointer space could be used for cursor variables declared to be IN arguments. Thus, any number of techniques could be used for passing cursor variables as arguments. However, regardless of the manner in which cursor variables are passed, they are passed as first class variables.

As a result of passing cursor variables as arguments, type checking must be implemented where necessary. According to one embodiment, type checking is implemented in the same manner as described above with reference to assignment statements. Thus, one embodiment of the invention performs type checking for: 1) the passing of strong cursor variables as arguments to routines with strongly typed parameters at compile-time; and 2) the passing of weak cursor variables as arguments to routines with strongly typed parameters at run-time. Of course, alternative embodiments could perform all the required type checking at run-time or disallow some combinations of routine parameters and actual arguments being passed. For example, an alternative embodiment could allow only weak cursor variables to be passed as arguments.

Example Code

To provide an example of using stored routines to open cursor variables, consider the stored routine below, which searches the database of a main library for books, periodicals, and tapes. A master table (named titles) stores the title and category code (1=book, 2=periodical, 3=tape) of each item. Three detail tables (named books, periodicals, and tapes) store category-specific information. When called, the stored routine (named find_item) searches the master table by title, uses the associated category code to pick an OPEN-FOR statement, then executes the OPEN-FOR statement to open a cursor variable that is associated with an active set of data from the appropriate detail table.

```
CREATE PACKAGE cv_types AS
  TYPE LibCurTyp IS REF CURSOR;
  ...
END cv_types;
CREATE PROCEDURE find_item (title VARCHAR2, lib_cv IN OUT
        cv_types.LibCurTyp, code OUT
        BINARY_INTEGER) AS
BEGIN
  SELECT item_code FROM titles INTO code WHERE item_title =
  title;
  IF code = 1 THEN
    OPEN lib_cv FOR SELECT * FROM books
      WHERE book_title = title;
  ELSIF code = 2 THEN
    OPEN lib_cv FOR SELECT * FROM periodicals
      WHERE periodical_title = title;
  ELSIF code = 3 THEN
    OPEN lib_cv FOR SELECT * FROM tapes
      WHERE tape_title = title;
  END IF;
END find_item;
```

In the above code, a cursor variable type named LibCurTyp is defined in the package cv_types. Next, the stored routine named find_item is defined having as arguments a character string named title, a cursor variable of the LibCurTyp type named lib_cv, and a variable of the BINARY_INTEGER type named code. The SELECT statement causes the titles stored in the column named item_title to be searched for a title that matches the contents of the argument title. When a match is found in a row, the data stored in the column named item_code for that row is stored in code. The subsequent if-then-else statements are used to select the appropriate OPEN-FOR statement based on the value stored in code. The selected OPEN-FOR statement associates lib_cv with an active set that includes the row from the table that contains the title. For example, if the input title is of a book, the first OPEN-FOR statement would be executed. This OPEN-FOR statement causes the creation of an active set having the row from the table books that contains the entered title.

In an alternative embodiment that supports OPEN-FOR statements with text string variables, the stored routine shown above may alternatively be defined as follows:

```
CREATE PROCEDURE find_item (title VARCHAR2, lib_cv IN OUT
        cv_types.LibCurTyp, code
        BINARY_INTEGER) AS
query VARCHAR2 (100);
BEGIN
    SELECT item_code FROM titles INTO code WHERE item_title =
    title;
    IF code = 1 THEN
       query := 'SELECT * FROM books
          WHERE book_title = title';
    ELSIF code = 2 THEN
       query := 'SELECT * FROM periodicals
          WHERE periodical_title = title';
    ELSIF code = 3 THEN
       query := 'SELECT * FROM tapes
          WHERE tape_title = title';
    END IF;
    OPEN lib_cv FOR query;
END find_item;
```

A client side application at a branch library might use the following PL/SQL block to display the retrieved information:

```
DECLARE
    lib_cv          cv_types.LibCurTyp;
    book_rec        books%ROWTYPE;
    periodical_rec  periodicals%ROWTYPE;
    tape_rec        tapes%ROWTYPE;
    code            BINARY_INTEGER;
    title           VARCHAR2 (100);
BEGIN
    get_title (title); -- retrieve title name from patron at the terminal
    find_item (title, lib_cv,code); - call stored routine
    find_item with the entered title
    IF code = 1 THEN
        FETCH lib_cv INTO book_rec;
        display_book (book_rec); -- call routine display_book
    ELSIF code = 2 THEN
        FETCH lib_cv INTO periodical_rec;
        display_periodical (periodical_rec); -- call routine
        display_periodical
    ELSIF code = 3 THEN
        FETCH lib_cv INTO tape_rec;
        display_tape (tape_rec); -- call routine display_tape
    END IF;
END;
```

In the above code, the variables lib_cv, book_rec, periodical_rec, tape_rec, title, and code are declared. The "get_title (title)" statement retrieves the title entered by a patron at a terminal. After retrieving the title, the stored routine find_item is called to associate the cursor variable lib_cv with the appropriate detail table based on whether the title is for a book, periodical, or tape. The subsequent if-then-else statements are used to select the appropriate FETCH statement and routine call based on the value stored in code. For example, if the input title is of a book, then: 1) the FETCH from lib_cv will cause the contents of the row in the active set associated with lib_cv to be stored in book_rec; and 2)display_book will be called to display information about the book.

Relationship to the Object-Oriented Paradigm

Cursor variables can be thought of as following the objected oriented paradigm used in a number of object-oriented languages (e.g., C++™, Smalltalk™, etc.). According to this paradigm, each cursor variable is viewed as an "instance" of a named "class" previously defined by the user. In one embodiment of the invention, the mechanism for generating cursor variables is encapsulated in a "system-provided class" (referred to herein as "generic REF CURSOR class") that may be included in an "object class library". In one implementation of this embodiment, this system-provided class does not have any "attributes", but has three "methods": OPEN, FETCH, and CLOSE (attributes and methods are well known concepts in object-oriented languages). Alternative embodiments may include any number of attributes and/or more, less, and/or different methods. According to this embodiment, user-defined REF CURSOR types would be naturally enabled through "inheritance" (a well known object-oriented concept). According to this concept, a class B is said to inherit from a class A if instances of class B possess all of the attributes and methods (if any) defined for class A (class B may additionally define attributes and methods unique to class B). A class that inherits from another class, that, in turn, inherits from one or more other classes is said to from a "class hierarchy."

Figure 13:
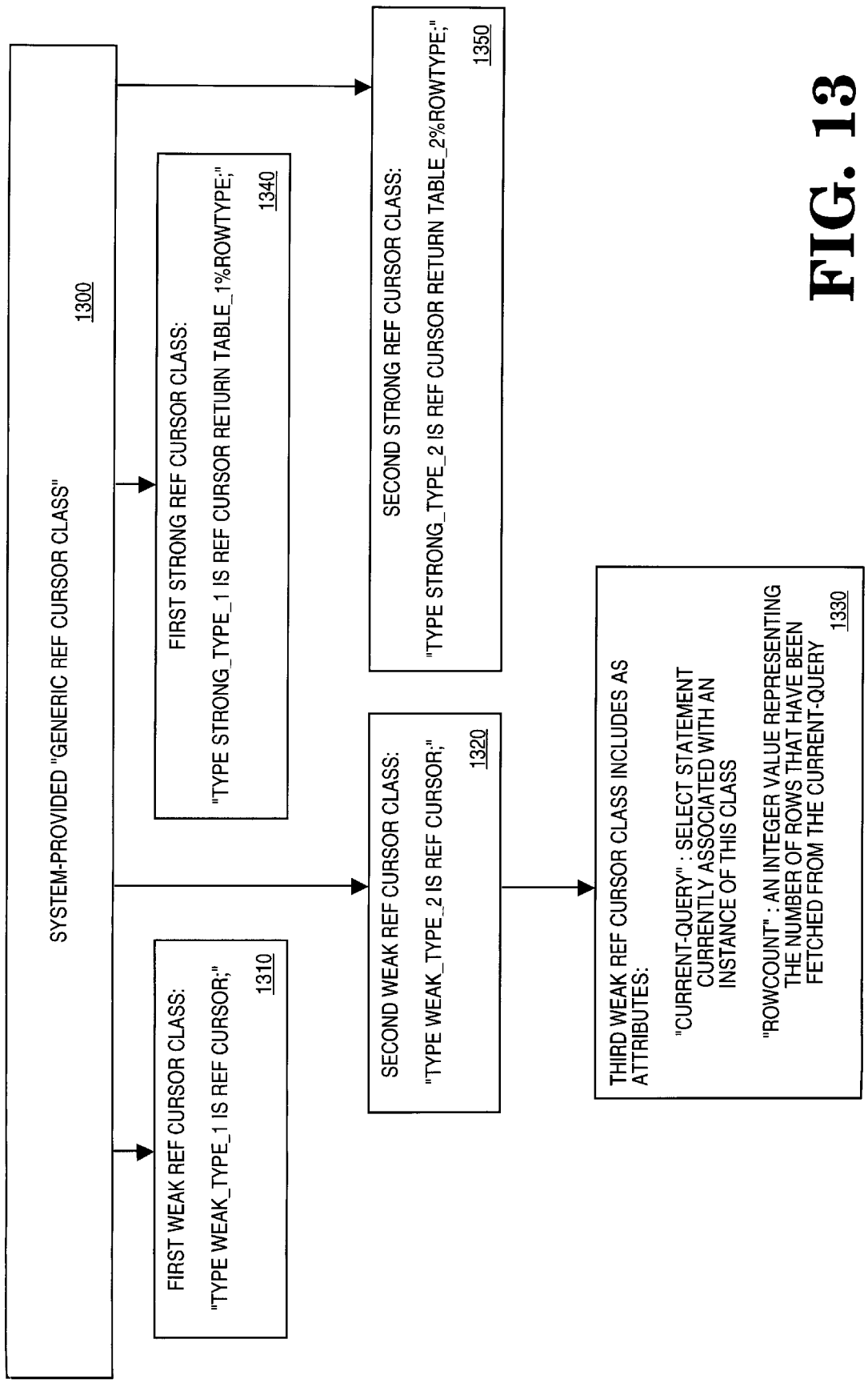
FIG. 13 is a block diagram illustrating example classes that introduce REF CURSOR types according to one embodiment of the invention.

FIG. 13 is a block diagram illustrating example classes that introduce REF CURSOR types according to one embodiment of the invention. FIG. 13 shows the system-provided class Generic REF CURSOR Class 1300 and arrows directed from this class to a number of inheriting classes. As illustrated, a first weak REF CURSOR class 1310, a second weak REF CURSOR class 1320, a first strong REF CURSOR class 1340, and a second strong REF CURSOR class 1350 all inherit from the generic REF CURSOR class 1300. In contrast, a third weak REF CURSOR class 1330 inherits from the second weak REF CURSOR class 1320. This third weak REF CURSOR class includes as attributes: 1) "CURRENT-QUERY" identifying the SELECT statement currently associated with an instance of this class; and 2) "ROWCOUNT" identifying the number of rows that have been fetched from the CURRENT-QUERY. In this manner, the advantages of object-oriented programming can be realized for cursor variable.

In one implementation of such an object oriented database, object classes are similar to tables, attributes are similar to columns, and object instances are similar to rows. Each query in this object oriented database would identify a set of object classes, a set of attributes, an order for the attributes, and criteria that object instances in the set of object classes must meet. In addition, an active set is the set of object instances that satisfy a query, while the currently selected object instance in an active set is similar to the current row of an active set. Regardless of the structure of the database (e.g., tables, object oriented, etc.), data in the active set that will be read in response to the next FETCH instruction (e.g., the current row) is referred to herein as the current set of data.

Certain Advantages of Cursor Variables

Figure 2:
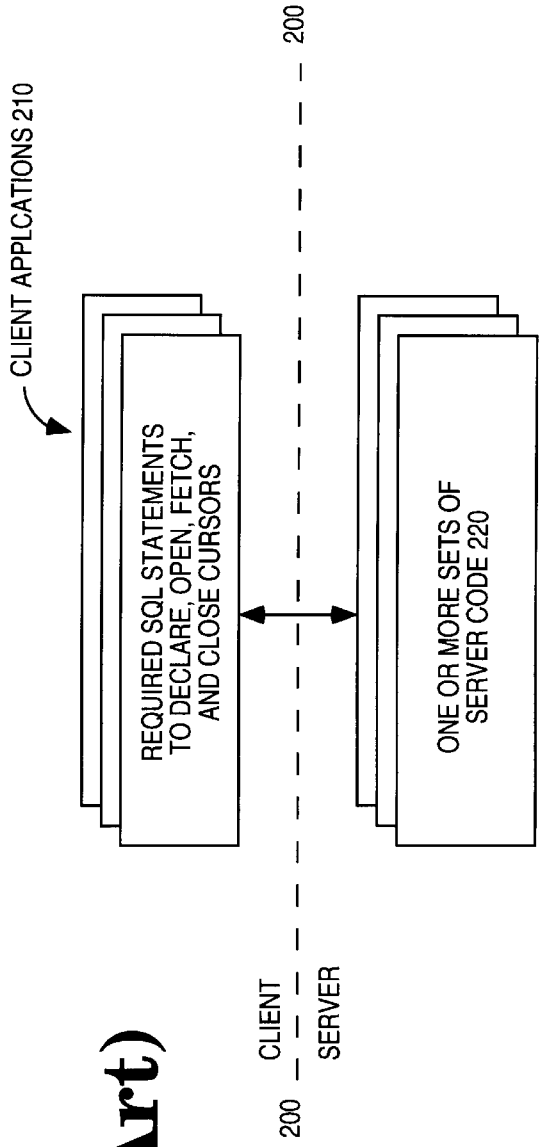
FIG. 2 is a block diagram illustrating the use of static and/or dynamic cursors in one database architecture.

While there are many advantages to the cursor variable construct, it is thought worthwhile to briefly describe certain of those advantages here. For example, as previously described with reference to FIG. 2, due to the lack of efficient means to retrieve multiple rows from stored routines, all the necessary open, fetch, and close statements for static cursors are typically contained in the client applications. In addition, since dynamic cursors cannot be used on the server side, all necessary statements for dynamic cursors must be contained in the client applications. As a result, adding new queries, modifying existing queries, or even altering existing database tables requires modifying each client application at each client site. Through the use of cursor variables, the opening, fetching, and closing of cursor variables can be more centrally located in the server code. For example, assume a stored routine that opens a cursor variable is stored in a server. Since a query is not associated with a cursor variable until the cursor variable is opened, the query will be determined by the stored routine on the server side. Since the cursor variable may be passed back to the client as an argument, the client application can call the stored routine to open the cursor and then perform some or all of the required fetches from the cursor variable. As a result, modifying existing queries can be performed by altering the stored routines at the sever site(s), rather than altering the client applications at each client site. Typically, the client sites greatly outnumber the server sites. In these situations, the effort and expense of applying patches or installing new versions is greatly reduced.

In addition, the passing of cursor variables as arguments between the client side and the server side can be used to reduce network round trips required to fetch rows from the database. In a client-server architecture, every request for a service from a server made by a client is a network round-trip. Before a request can be sent to a server, a communication channel must be established between the server and the client. Establishing a communication channel requires a large amount of overhead (e.g., exchanging acknowledgment messages, comparing network capabilities, etc.) Since this overhead does not depend on the amount of data which is subsequently transmitted over the communications channel, it is advantageous to send and receive as much data as possible over an established communications channel. As an example, assume a client application needs to process the results of 5 queries simultaneously. Using static cursors or dynamic cursors requires 5 server calls (one for each query), each of which requires the creation of a communication channel. In contrast, using 5 cursor variables as arguments to one stored routine, a client application may obtain 5 open cursors using a single remote routine call. As a result, only one communication channel must be established. Alternatively, a block of program code (e.g., PL/SQL code) containing the required 5 OPEN-FOR statements could be passed from the client application to the server (the passing of blocks of program code from a client application to server is well known in the art). In both solutions, the number of network round trips is reduced to one.

Since cursor variables can be passed as arguments, cursor variables provide a number of advantages over the result set construct. For example, certain databases include a mechanism (typically referred to as the "catalog" or "table of contents" for the database) which allows the entities (e.g., tables, procedures, functions, packages, etc.) of a database to be browsed. Using this catalog, the argument list of a routine can be accessed. Being able to view the argument list of a routine is useful to programming tools. For example, programming tools can be implemented to access the argument list of a routine using this catalog to automatically generate applications for handling a given routine. Since cursor variables are part of the argument list, one embodiment of a programming tool can determine whether one or more cursor variables are arguments of a routine, as well as information about any such cursor variables (e.g., the types of the cursor variables, etc.), using the catalog. If one or more cursor variables are arguments of a given routine, then this programming tool can automatically create application (s) for handling the cursor variables of the routine (e.g., screen tables to handle the active sets). In contrast, since the result set construct cannot be passed as an argument, the result set construct is not included in the argument list of a routine. Since the result set construct is not included in the argument list of a routine, a typical catalog cannot be used to determine whether a given routine will return a result set. As a consequence, programming tools cannot use a typical catalog to provide support for handling any result set that will be returned upon execution of a given routine.

Another advantage of being able to pass cursor variables as arguments is that it is simply good programming practice to fully specify the behavior of a routine in its argument list, because fully specifying the behavior of a routine in its argument list allows callers of that routine to know what to expect. An additional advantage is that cursor variables need not be passed back to the client, but can be passed between stored routines. Another advantage is that a stored routine may fetch the first N rows from a cursor variable before returning. If by fetching the first N rows of an active set a stored routine is able to handle all required processing, there is no need for further interaction with the client.

In addition, the use of cursor variables allows multiple data streams to be opened on a single stored routine call, as opposed to the result set construct which opens only one. In the example in the background, a first select statement identified 5,000 rows from Table 1 and a second select statement identified 4,000 rows from Table 2. Using cursor variables, a stored routine would be created that received as arguments two cursor variables. A first OPEN-FOR statement would be used to associate the first cursor variable with the first select statement, while a second OPEN-FOR statement would be used to associate the second cursor variable with the second select statement. Upon completion of the stored routine and return of the cursor variables to the calling routine, two data streams would be opened rather than one. As a result, if the client application needs the first five rows from both tables, it can access the first five rows of Table 1 using the first cursor variable, and access the first five rows of Table 2 using the second cursor variable. In addition, the PL/SQL engine handles all the decoding of the data streams. Thus, the client application does not need to detect row identifiers or where rows begin and end. Furthermore, since the use of cursor variables is very similar to standard high-level programming language constructs (e.g., variables), their use is intuitive to programmers.

As previously described, the passing of a collection variable as an argument to return rows of an active set to a calling routine suffers from several limitations. However, since cursor variables can be passed as arguments, the limitations associated with returning rows of an active set to a calling routine using a collection variable can be overcome through the use of a cursor variable.

Alternative Embodiments

While the concept of the cursor variable construct has been described with reference to altering various aspects of the active set, supporting strong and weak cursor variable types, passing cursor variables between various entities (e.g., client to server, server to server) in the database architecture, and type checking with reference to fetching, it is understood that alternative embodiments may comprise any number of these features. In addition, while the syntax of various statements has been described for manipulating cursor variables, it is understood that alternative embodiments implement different statements or statements having a different syntax.

Various Application Program Interfaces (e.g., database interface libraries and embedded SQL implementations such as Oracle OCI interface, SQL CLI, Microsoft ODBC and Pro*C) use different objects to denote the set of rows returned from a query and the current position in that set of rows. It is understood that support for the use of cursor variables in conjunction with Application Program Interfaces can be implemented and PL/SQL cursor variables can be bound to the objects supported by such Application Program Interfaces. For example, when an Oracle OCI client invokes a stored routine returning a cursor variable, the returned cursor variable is bound to an OCI csrdef object.

For the purposes of explanation, embodiments of the present invention have been described with reference to a relational database system in which data is stored in tables that have rows and columns. However, the present invention is not limited to any particular type of database storage format. For example, cursor variables may be used in an object-oriented database, where data is stored in objects. In an object-oriented embodiment, object types or object collections may take the place of tables, objects may take the place of rows, and attributes may take the place of columns. The active set associated with a cursor variable may be a set of objects that satisfy the query associated with the cursor variable. The "current row pointer" would point to a current object in the active set. The embodiments described herein are merely exemplary. The implementation of cursor variables in any particular type of database environment may vary from implementation to implementation.

In addition, while the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A compiler for compiling source code that is written in a programming language that supports a plurality of types of variables, wherein one type of variable of said plurality of types of variables is a variable type for returning data in active sets of data from a database, wherein each active set of data is the data in said database that satisfies a corresponding database query, wherein said programming language includes native commands that provide for defining, declaring, opening, and fetching from each active set associated with a variable of said variable type and do not require embedded code or a host environment for the variable type, wherein said variable type is a native variable type of said single programming language and does not require variables of said variable type to be bound to a host variable in a host programming language.

2. The compiler of claim 1, wherein a variable of said variable type may be passed as an argument between routines.

3. The compiler of claim 1, wherein said single programming language also provides commands for assigning variables of said variable type to each other.

4. The compiler of claim 1, wherein said single programming language provides for a weakly typed version of said variable type, and wherein said compiler does not generate error messages in response to compiling source code that attempts to fetch data using a weakly typed variable of said variable type into a set of data structures that are not type-compatible, but provides for type checking of data fetched using said weakly typed variable into said set of data structures at run-time.

5. The compiler of claim 1, wherein said programming language provides a plurality of classes of said variable type.

6. The compiler of claim 5, wherein said plurality of classes includes a strong class type and a weak class type.

7. The compiler of claim 6, wherein said plurality of classes further includes a generic class type, said strong class type and said weak class type being decedents of said generic class type.

8. The compiler of claim 1, wherein the data in said database is stored as object instances, each object instance in said database conforming to at least one of a plurality of object classes.

9. The compiler of claim 8, wherein each active set of data includes the set of object instances in said database that satisfy said corresponding database query.

10. The compiler of claim 8, wherein each said corresponding database query identifies a set of object classes, a set of attributes, and an order for the attributes in said set of attributes.

11. The compiler of claim 9, wherein each corresponding database query also identifies a set of criteria that object instances in the identified set of object classes must meet.

12. The compiler of claim 1, wherein said single programming language provides for a weakly typed and strongly typed variables of said variable type, wherein said single programming language provides for assigning a given weakly typed variable of said variable type to a given strongly typed variable of said variable type, and wherein said compiler does not generate error messages in response to compiling source code that attempts to assign an active set currently associated with said given weakly typed variable to said given strongly type variable, but provides for type checking of said given strongly typed variable to said active set currently associated with said given weakly type variable at run-time.

13. The compiler of claim 12, wherein said single programming language provides for assigning said given storing typed variable to a different strongly typed variable of said variable type, and wherein said compiler provides for type checking of said different strongly typed variable to said active set currently associated with said given strongly typed variable at run-time.

14. The compiler of claim 12, wherein said compiler provides for type checking of data fetched using said given weakly typed variable into a set of data structures at run-time.

15. A method for accessing data in a database of a computer system, said method comprising the computer-implemented steps of:

executing a server side routine on one or more processors in said computer system responsive to the execution of a portion of a client side routine that calls said server side routine using a remote routine call, said server side routine being compiled from source code that includes a formal parameter, said step of executing causing said one or more processors to perform the steps of:

passing from said client side routine to said server side routine, as an argument associated with said formal parameter, data that identifies an active set of data from said database, wherein said active set is the data in said database that satisfies a database query.

16. The method of claim 15, wherein said step of passing further comprises the steps of:
    allocating within a memory of said computer system a first space associated with said formal parameter; and
    storing in said first space said data that identifies said active set.

17. The method of claim 16, wherein said step of executing further comprises the step of copying the contents of said first space into a second space associated with said argument and said client side routine.

18. The method of claim 16, wherein said step of executing further comprises the step of:
    upon completion of executing said server side routine, passing from said server side routine to said client side routine, as said argument associated with said formal parameter, the data currently associated with said formal parameter.

19. A method for accessing data in a database of a computer system, said method comprising the computer-implemented steps of:
    executing a client side routine on one or more processors in said computer system that calls a server side routine using a remote routine call, said client side routine being compiled from source code that includes a declared variable, said step of executing causing said one or more processors to perform the steps of:
        passing from said client side routine to said server side routine, as an argument associated with a formal parameter of said server side routine, a data associated with said declared variable that identifies an active set of data from said database, wherein said active set is the data in said database that satisfies a database query.

20. The method of claim 19, wherein said step of passing further comprises the steps of:
    allocating within a memory of said computer system a first space associated with said formal parameter; and
    storing in said first space said data that identifies said active set.

21. The method of claim 20, wherein said step of executing further comprises the step of copying the contents of said first space into a second space associated with said argument and said server side routine.

22. The method of claim 21, wherein said step of executing further comprises the step of:
    upon completion of executing said client side routine, passing from said client side routine to said server side routine, as said argument associated with said formal parameter, the data currently associated with said formal parameter.

23. A method for accessing data in a database of a computer system, said method comprising the computer-implemented steps of:
    executing executable code on one or more processors in said computer system, said executable code being compiled from source code that includes a remote routine call from a client side routine to a server side routine that requires passing a cursor variable as an argument, said source code of said server side routine also including a formal parameter for said argument, said step of executing causing said one or more processors to perform the steps of:
        allocating a first memory space associated with said client side routine for holding data that corresponds to said argument;
        allocating a second memory space associated with said server side routine for holding data that corresponds to said formal parameter;
        transferring a first set of data between said first and said second memory space in response to one of calling said server side routine from said client side routine or returning to said client side routine from said server side routine, wherein said first set of data is used for accessing sets of data in said database that satisfy a database query.

24. The method of claim 23, wherein the portion of said executable code corresponding to said server side routine is a stored routine.

25. The method of claim 23, wherein:
    said call requires passing said cursor variable as said argument from said client side routine to said server side routine; and
    said step of transferring includes the step of copying said first set of data from said first memory space into said second memory space.

26. The method of claim 23, wherein:
    said call requires passing said cursor variable as said argument from said server side routine to said client side routine; and
    said step of transferring includes the step of copying said first set of data from said second memory space into said first memory space.

27. A method for accessing data in a database of a computer system, said method comprising the computer-implemented steps of:
    executing executable code on one or more processors in said computer system, said executable code being compiled from source code that contains a first and a second symbolic reference for cursor variables and a statement assigning said second symbolic reference to said first symbolic reference, said first symbolic reference being associated with a first ordered plurality of data types defining a return type, said first ordered plurality of data types representing the order of the data types with which each set of data accessed from said database through said first symbolic reference must be type-compatible, said step of executing causing said one or more processors to perform the steps of:
        determining said second symbolic reference is associated with an active set of data from said database, the active set being the sets of data in said database that satisfies a database query;
        identifying a second ordered plurality of data types, the second ordered plurality of data types representing the order of the data types in each set of data in said active set; and
        executing a portion of said executable code that corresponds (a said statement assigning said second symbolic reference to said first symbolic reference by performing the steps of:
            comparing each data type in said second ordered plurality of data types to the data type in the same position of said first ordered plurality of data types to determine if said second ordered plurality of data types are type-compatible with said first ordered plurality of data types;
            determining said second ordered plurality of data types are not type-compatible with said first ordered plurality of data types; and
            generating an error message.

28. The method of claim 27, wherein said first and second symbolic references are respectively for a strongly typed cursor variable and a weakly typed cursor variable.

29. The method of claim 27, wherein:
said source code also contains a third symbolic reference for a weakly typed cursor variable and statements assigning said third symbolic reference to said second symbolic reference and opening said third symbolic reference, and wherein said second symbolic reference is for a strongly typed cursor variable;
said determining further including,
- declaring said weakly typed cursor variable for said third symbolic reference;
- execution a portion of said executable code that corresponds to the statement assigning said third symbolic reference to said second symbolic reference by performing the steps of:
  - aliasing said strongly typed cursor variable for said second symbolic reference with said weakly typed cursor variable before opening said weakly typed cursor variable; and
  - opening said weakly typed cursor variable.

30. A method for accessing data in a database of a computer system, said method comprising the computer-implemented steps of:
executing executable code on one or more processors in said computer system, said executable code being compiled from source code that contains a first symbolic reference for a cursor variable, a set of symbolic references for one or more data structures, and a statement specifying that a set of data accessed from said database through said first symbolic reference be stored such that the set of data is accessible using said set of symbolic references, said source code also identifying a data type for each symbolic reference in said set of symbolic references, the order of said set of symbolic references in said statement identifying a first ordered plurality of data types, said step of executing causing said one or more processors to perform the steps of:
- allocating within a memory of said computer system a first space for holding data that corresponds to said first symbolic reference;
- storing in said first space a value that one of directly and indirectly points to a current set of data in an active set of data accessed from said database, said active set being the sets of data in said database that satisfy a database query;
- identifying a second ordered plurality of data types, the second ordered plurality of data types representing the order of the data types in each set of data in said active set; and
- allocating within said memory a plurality of spaces for holding data corresponding to said set of symbolic references, wherein each space in said plurality of spaces is for holding data of the data type identified for said corresponding symbolic reference;
- executing a portion of said executable code that corresponds to said statement by performing the steps of:
  - comparing each data type in said second ordered plurality of data types to the data type in the same position of said first ordered plurality of data types to determine if said second ordered plurality of data types are type-compatible with said first ordered plurality of data types; and
  - if said second ordered plurality of data types are type-compatible with said first ordered plurality of data types, then copying the individual data elements of the current set of data of said active set into corresponding ones of said plurality of spaces; and
  - if said second ordered plurality of data types are not type-compatible with said first ordered plurality of data types, then generating an error message.

31. The method of claim 30, wherein said second ordered plurality of data types are type-compatible with said first ordered plurality of data types if said second ordered plurality of data types contains the same data types in the same order as said first ordered plurality of data types.

32. The method of claim 30, wherein:
said second ordered plurality of data types are type-compatible with said first ordered plurality of data types if each data type in said second ordered plurality of data types is the same as or can be converted into the data type in the same position of said first ordered plurality of data types; and
said step of copying the data accessed from said database into corresponding ones of said plurality of spaces comprises the steps of:
for each individual data element copied from the current set of data that is not of the same data type as the corresponding one of said plurality of spaces, converting said individual data element into the storage format of the data type of the corresponding one of said plurality of spaces prior to storing said individual data element in the corresponding one of said plurality of spaces.

33. The method of claim 30, wherein:
said source code also associates said first symbolic reference with a third ordered plurality of data types, said third ordered plurality of data types representing the order of the data types with which each set of data accessed from said database through said first symbolic reference must be type-compatible; and
said step of copying the data accessed from said database into corresponding ones of said plurality of spaces comprises the steps of:
- for each individual data element copied from the current set of data that is not of the same data type as the corresponding data type in said third ordered plurality of data types, converting said individual data element into the storage format of the data type of the corresponding one of said third ordered plurality of data types, and
- for each individual data element copied from the current set of data that is not of the same data type as the corresponding data type in said plurality of spaces, converting said individual data element into the storage format of the data type of the corresponding one of said plurality of spaces;
- storing the individual elements in the corresponding ones of said plurality of spaces.

34. The method of claim 30, wherein said cursor variable is weakly typed.

35. A database architecture comprising:
a client side including,
- a client side engine to execute routines written in a programming language,
- a first routine, for execution by said client side engine, including instructions written in said programming language whose execution by said client side engine causes a cursor variable to be declared, opened, and fetched from without using embedded code or a host environment; and
a server side including,
- a database, and
- a server side engine, coupled to said database and accessible by said client side engine, to execute routines written in said programming language.

36. The database architecture of claim 35, wherein:
said instructions open said cursor variable for a first query, and said server side engine to receive said query, execute said query, generate an active set for said query, and sending to said client side engine a unique identifier for said active set to be associated with said cursor variable.

37. The database architecture of claim 36, said client side further comprising:
a cursor pointer space to store said unique identifier; and
a memory space opened for said first routine, said memory space including a cursor variable space for said cursor variable, said cursor variable space to store a pointer to said cursor pointer space.

38. The database architecture of claim 35, said client side further comprising:
a second routine, said first routine also including instructions written in said programming language whose execution by said client side engine causes said cursor variable to be passed as an argument to said second routine.

39. The database architecture of claim 38, said client side further comprising:
a cursor pointer space to store a unique identifier, said unique identifier identifying an active set currently associated with said cursor variable, and
a first and second memory spaces respectively opened for said first and second routines, said first memory spaces each including a cursor variable space for said cursor variable, said first and second cursor variable spaces each to store a pointer to said cursor pointer space, said pointer being copied from said first cursor variable space to said second cursor variable space when said cursor variable is passes as said argument from said first routine to said second routine.

40. The database architecture of claim 38, wherein said cursor variable of said first routine is weakly typed and said cursor variable of said second routine is strongly typed, wherein said client side engine performs run-time type checking when said cursor variable of said fist routine is passed as an argument to said cursor variable of said second routine.

41. The database architecture of claim 38, said second routine including instructions written in said programming language whose execution by said client side engine causes said cursor variable to be returned to said first routine.

42. The database architecture of claim 35, said server side further comprising;
a second routine for execution by said server side engine, said first routine also including instructions written in said programming language whose execution by said client side engine causes said cursor variable to be passed as an argument to said second routine as part of a remote routine call.

43. The database architecture of claim 42, wherein:
said client side further includes,
a cursor pointer space to store a unique identifier, said unique identifier identifying an active set currently associated with said cursor variable,
a memory space opened for said first routine, said memory space including a cursor variable space for said cursor variable, said cursor variable space to store a pointer to said cursor pointer space; and
said server side further includes,
a cursor pointer space to store said unique identifier copied from said cursor pointer space on said client side upon passing said cursor variable as said argument,
a memory space opened for said second routine, said memory space including a cursor variable space for said cursor variable, said cursor variable space to store a pointer to said cursor pointer space on said server side.

44. The database architecture of claim 42, wherein said cursor variable of said first routine is weakly typed and said cursor variable of said second routine is strongly typed, wherein said server side engine performs run-time type checking when said cursor variable of said first routine is passed as an argument to said cursor variable of said second routine.

45. The database architecture of claim 42, said second routine including instructions written in said programming language whose execution by said server side engine causes said cursor variable to be returned to said first routine.

46. A machine readable medium having stored thereon:
a client side routine for execution by a client side engine, said client side routine including instructions written in a programming language whose execution causes,
passing a cursor variable as an argument as part of a remote routine call to a server side routine on a server side of said database architecture;
said server side routine for execution by a server side engine, said server side routine including instructions written in said programming language whose execution causes,
selecting one of a plurality of queries for said cursor variable;
opening said cursor variable with said selected query;
returning said cursor variable to said client side routine as part of said remote routine call.

47. The machine readable medium of claim 46, wherein said client side routine also including instructions written in said programming language whose execution also causes,
fetching data using skid cursor variable from an active set generated from a database on said server side responsive to said opening of said cursor variable.

48. The machine readable medium of claim 46, wherein said server side routine also including instructions written in said programming language whose execution also causes,
fetching data using said cursor variable from an active set generated from a database on said server side responsive to said opening of said cursor variable.

49. A machine readable medium having stored thereon sequences of instructions, which when executed by a set of processors, cause said set of processors to perform the following:
declaring a weakly typed cursor variable;
opening said weakly typed cursor variable for a first database query, wherein a first active set includes sets of data in said database that each satisfy said database query, wherein each of said sets of data in said active set share a type;
in response to attempting to fetch from said weakly typed cursor variable a current set of data from said active set into a set of one or more data structures defining a type for said fetch, performing the following,
type checking the type of said current set of data to said type for said fetch.

50. The machine readable medium of claim 49, wherein said sequences of instructions, when executed, further cause said set of processors to perform the following:
declaring a strongly typed cursor variable, wherein said strongly typed cursor variable can only be used to access data from active sets that are type-compatible with the type of said strongly typed cursor variable;

in response to attempting to assign said weakly typed cursor variable to said strongly typed cursor variable, performing the following,
   type checking the type of said active set to said type for strongly typed cursor variable.

51. The machine readable medium of claim 49, wherein said sequences of instructions, when executed, further cause said set of processors to perform the following:

declaring a strongly typed cursor variable, wherein said strongly typed cursor variable can only be used to data from active sets that are type-compatible with the type of said strongly typed cursor variable;

assigning said weakly typed cursor variable to said strongly typed cursor variable before said weakly typed cursor variable is opened;

subsequent to said opening and in response to attempting to fetch from said strongly typed cursor variable a current set of data from said active set into a set of one or more data structures defining a type for said fetch, performing the following,
   type checking the type of said current set of data from said active set to said type for said fetch from said strongly typed cursor variable.

* * * * *